(12) United States Patent
Hagadorn et al.

(10) Patent No.: US 8,669,326 B2
(45) Date of Patent: Mar. 11, 2014

(54) AMINE FUNCTIONALIZED POLYOLEFIN AND METHODS FOR PREPARATION THEREOF

(75) Inventors: John R. Hagadorn, Houston, TX (US); Donna J. Crowther, Seabrook, TX (US); Renuka N. Ganesh, Houston, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 418 days.

(21) Appl. No.: 13/072,189

(22) Filed: Mar. 25, 2011

(65) Prior Publication Data

US 2012/0245276 A1 Sep. 27, 2012

(51) Int. Cl.
C08K 5/07 (2006.01)
C08L 61/00 (2006.01)
C08F 8/00 (2006.01)

(52) U.S. Cl.
USPC ............................ 525/157; 525/194

(58) Field of Classification Search
USPC ................................ 525/157, 194
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A * | 8/1995 | Tomita et al. | 525/293 |
| 5,498,809 A | 3/1996 | Emert et al. | |
| 5,504,172 A | 4/1996 | Imuta et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 5,811,379 A | 9/1998 | Rossi et al. | |
| 5,859,159 A | 1/1999 | Rossi et al. | |
| 5,936,041 A | 8/1999 | Diana et al. | |
| 6,017,859 A | 1/2000 | Rossi et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |
| 6,255,426 B1 | 7/2001 | Lue et al. | |
| 6,268,518 B1 | 7/2001 | Resconi et al. | |
| 6,410,666 B1 | 6/2002 | Grubbs et al. | |
| 6,444,773 B1 | 9/2002 | Markel | |
| 6,448,350 B1 | 9/2002 | Dall'Occo et al. | |
| 6,476,167 B2 | 11/2002 | Peters | |
| 6,525,157 B2 | 2/2003 | Cozewith et al. | |
| 6,703,457 B2 | 3/2004 | Van Baar et al. | |
| 6,750,307 B2 | 6/2004 | Weng et al. | |
| 6,897,261 B1 | 5/2005 | Machida et al. | |
| 6,939,930 B2 | 9/2005 | Reinking et al. | |
| 7,126,031 B2 | 10/2006 | Boussie et al. | |
| 7,247,385 B1 | 7/2007 | Tzoganakis et al. | |
| 7,276,567 B2 | 10/2007 | Voskoboynikov et al. | |
| 7,294,681 B2 | 11/2007 | Jiang et al. | |
| 7,524,910 B2 | 4/2009 | Jiang et al. | |
| 7,541,413 B2 | 6/2009 | Crowther et al. | |
| 7,589,160 B2 | 9/2009 | Resconi et al. | |
| 7,790,810 B2 | 9/2010 | Coates et al. | |
| 7,820,607 B2 | 10/2010 | Matsuda et al. | |
| 7,897,679 B2 | 3/2011 | Stevens et al. | |
| 7,943,716 B2 | 5/2011 | Resconi et al. | |
| 7,960,487 B2 | 6/2011 | Yang et al. | |
| 8,058,351 B2 | 11/2011 | Pawlow et al. | |
| 2002/0137978 A1 | 9/2002 | Grubbs et al. | |

(Continued)

FOREIGN PATENT DOCUMENTS

CN 101011062 8/2007
EP 0 767 182 4/1997

(Continued)

OTHER PUBLICATIONS

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.

Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.

Babu et al., "*Microstructure of Poly(1-hexene) Produced by ansa-Zirconocenium Catalysis*", Macromolecules, 1994, vol. 27, pp. 3383-3388.

Baldwin et al., "*Cationic Alkylaluminum-Complexed Zirconocene Hydrides as Participants in Olefin Polymerization Catalysis*", JACS, 2010, vol. 132, pp. 13969-13971.

Bhriain et al., "*Polymeryl-Exchange Between Ansa-Zirconocene Catalysts for Norbornene-Ethene Copolymerization and Aluminum or Zinc Alkyls*", Macromolecules, 2005, vol. 38, pp. 2056-2063.

(Continued)

*Primary Examiner* — Nathan M Nutter

(74) *Attorney, Agent, or Firm* — Kevin M. Faulkner; Catherine L. Bell

(57) ABSTRACT

This invention relates to a process to functionalize polyolefins comprising contacting a transition metal amide catalyst with an amine (preferably a secondary amine), and one or more vinyl terminated materials, preferably one or more vinyl terminated polyolefins. This invention further relates to the amine-functionalized polyolefins produced thereby.

24 Claims, 10 Drawing Sheets

(56) References Cited

U.S. PATENT DOCUMENTS

| | | |
|---|---|---|
| 2003/0161752 A1 | 8/2003 | Luk et al. |
| 2004/0054086 A1 | 3/2004 | Schauder et al. |
| 2004/0127649 A1 | 7/2004 | Arjunan |
| 2004/0214953 A1 | 10/2004 | Yamada et al. |
| 2004/0249046 A1 | 12/2004 | Abhari et al. |
| 2005/0054793 A1 | 3/2005 | Reinking et al. |
| 2005/0159299 A1 | 7/2005 | Rodriguez et al. |
| 2005/0261440 A1 | 11/2005 | Dickakian et al. |
| 2006/0052553 A1 | 3/2006 | Resconi et al. |
| 2006/0270814 A1 | 11/2006 | Mako et al. |
| 2007/0293640 A1 | 12/2007 | Jiang et al. |
| 2008/0228017 A1 | 9/2008 | Burdett et al. |
| 2008/0234451 A1 | 9/2008 | Kenwright et al. |
| 2009/0198089 A1 | 8/2009 | Burton et al. |
| 2009/0221750 A1 | 9/2009 | Tsunogae et al. |
| 2009/0247441 A1 | 10/2009 | Baum |
| 2009/0318640 A1 | 12/2009 | Brant et al. |
| 2009/0318644 A1 | 12/2009 | Brant et al. |
| 2009/0318646 A1 | 12/2009 | Brant et al. |
| 2009/0318647 A1 | 12/2009 | Hagadorn et al. |
| 2010/0069573 A1 | 3/2010 | Arriola et al. |
| 2010/0152388 A1 | 6/2010 | Jiang et al. |
| 2010/0170829 A1 | 7/2010 | Ng et al. |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 1993/320260 | 3/1993 |
| JP | 2000/038420 | 2/2000 |
| JP | 2005/139284 | 6/2005 |
| JP | 2005-336092 | 12/2005 |
| JP | 2007/169340 | 7/2007 |
| JP | 2007/246433 | 9/2007 |
| JP | 2008/050278 | 3/2008 |
| JP | 2009-299046 | 12/2009 |
| JP | 2010/037555 | 2/2010 |
| JP | 2010-202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp*)(C2B9H_{11})M(R)$ $(M=Hf, Zr)$", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp*_2Mme(THT)]^+[BPh_4]^-$, $M=Ti, Zr$ and $Hf$", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging", Chem. Mater., 2010, vol. 22, pp. 2764-2769.

Harney et al., "End-Group-Confined Chain Walking Within a Group 4 Living Polyolefin and Well-Defined Cationic Zirconium Alkyl Complexes for Modeling This Behavior", JACS, 2004, vol. 126, pp. 4536-4537.

Herzon et al., "Direct, Catalytic Hydroaminoalkylation of Unactivated Olefins with N-Alkyl Arylamines", JACS, 2007, vol. 129, pp. 6690-6691.

Herzon et al., "Hydroaminoalkylation of Unactivated Olefins with Dialkylamines", JACS, 2007, vol. 130, pp. 14940-14941.

Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.

Janiak et al., "Metallocene Catalysts for Olefin Oligomerization", Macromol. Symp., 2006, vol. 236, pp. 14-22.

Janiak et al., "Metallocene and Related Catalysts for Olefin, Alkyne and Silane Dimerization and Oligomerization", Coordination Chemistry Reviews, 2006, vol. 250, pp. 66-94.

Jiang et al., "Highly Z-Selective Metathesis Homocoupling of Terminal Olefins", JACS, 2009, vol. 131, pp. 16630-16631.

Jones et al., "Synthesis and Reactive Blending of Amine and Anhydride End-Functional Polyolefins", Polymer, 2004, vol. 45, pp. 4189-4201.

Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.

Kesti et al., "Group 4 Metallocene Olefin Hydrosilyation Catalysts", Organometallics, 1992, vol. 11, pp. 1095-1103.

Kissin et al., "Post-Oligomerization of a-Olefin Oligomers: A Route to Single-Component and Multipcomponent Synthetic Lubricating Oils", Journal of Applied Polymer Science, 2009, vol. 111, pp. 273-280.

Kobayashi, "Routes to Functionalized Polyolefins", The Dow Chemical Company.

(56) References Cited

OTHER PUBLICATIONS

Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.
Kolodka et al., "*Synthesis and Characterization of Long-Chain-Branched Polyolefins with Metallocene Catalysts: Copolymerization of Ethylene with Poly(Ethylene-Co-Propylene) Macromonomer*", Macromol. Rapid Commun., 2003, vol. 24, pp. 311-315.
Koo et al., "*Efficient New Routes to Functionalized Polyolefins*", ChemTech. 1999, pp. 13-19.
Kostalik et al., "*Solvent Processable Tetraalkylammonium-Functionalized Polyethylene for Use as an Alkaline Anion Exchange Membrane*", Macromolecules, 2010, vol. 43, pp. 7147-7150.
Kubiak et al., "*Titanium-Catalyzed Hydroaminoalkylation of Alkenes by C-H Bond Activation at SP3 Centers in the Alpha-Position to a Nitrogen Atom*", Angewandte Chemie International Edition, 2009, vol. 48, No. 6, pp. 1153-1156.
Langston et al., "*One-Pot Synthesis of Long Chain Branch PP (LCBPP) Using Ziegler-Natta Catalyst and Branching Reagents*", Macromol. Symp., 2007, vol. 260, pp. 34-41.
Lehmus et al., "*Chain End Isomerization as a Side Reaction in Metallocene-Catalyzed Ethylene and Propylene Polymerizations*", Macromolecules, 2000, vol. 33, pp. 8534-8540.
Lopez et al., "*Synthesis of Well-Defined Polymer Architectures by Successive Catalytic Olefin Polymerization and Living/Controlled Polymerization Reactions*", Progress in Polymer Science, 2007, vol. 32, pp. 419-454.
Lu et al., "*Reactivity of Common Functional Groups with Urethanes: Models for Reactive Compatibilization of Thermoplastic Polyurethane Blends*", Journal of Polymer Science: Part A: Polymer Chemistry, 2002, vol. 40, pp. 2310-2328.
Markel et al., "*Metallocene-Based-Branch—Block Thermoplastic Elastomers*", Macromolecules, 2000, vol. 33, pp. 8541-8548.
Mathers et al., "*Cross Metathesis Functionalization of Polyolefins*", Chem. Commun., 2004, pp. 422-423.
Moscardi et al., "*Propene Polymerization with the Isospecific, Highly Regioselective rac-Me$_2$C(3-t-Bu-1-Ind)$_2$ZrCl$_2$/MAO Catalyst. 2. Combined DFT/MM Analysis of Chain Propagation and Chain Release Reactions*", Organometallics, 2001, vol. 20, pp. 1918-1931.
Negishi et al., "*Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diyness[1]*", Tetrahedron Letters, 1986, vol. 27, No. 25, pp. 2829-2832.
Nilsson et al., "*Structural Effects on Thermal Properties and Morphology in XLPE*", European Polymer Journal, 2010, vol. 46, pp. 1759-1769.
Ornealis et al., "*Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction*", JACS, 2008, vol. 130, pp. 1495-1506.
Ornealis et al., "*Efficient Mono- and Bifunctionalization of Polyolefin Dendrimers by Olefin Metathesis*", Angewandte Chemie International Edition, 2005, vol. 44, pp. 7399-7404.
Parks et al., "*Studies on the Mechanism of B(C$_6$F$_5$)$_3$-Catalyzed Hydrosilation of Carbonyl Functions*", J. Org. Chem., 2000, vol. 65, pp. 3090-3098.
Prochnow et al., "*Tetrabenzyltitanium: An Improved Catalyst for the Activation of SP3 C—H Bonds Adjacent to Nitrogen Atoms*", ChemCatChem, 2009, vol. 1, No. 1, pp. 162-172.
Resconi et al., "*Chain Transfer Reactions in Propylene Polymerization with Zirconocene Catalysts*", Topics in Catalysis, 1999, vol. 7, pp. 145-163.
Resconi et al., "*Olefin Polymerization at Bis(pentamethylcyclopentadienyl)zirconium and—hafnium Centers: Chain-Transfer Mechanisms*", JACS, 1992, vol. 114, pp. 1025-1032.

Reznichenko et al., "*Group 5 Metal Binaptholate Complexes for Catalytic Asymmetric Hydroaminoalkylation and Hydroamination/Cyclization*", Organometallics, 2011, vol. 30, pp. 921-924.
Roesky, "*Catalytic Hydroaminoalkylation*", Angewandte Chemie International Edition, 2009, vol. 48, pp. 4892-4894.
Rose et al., "*Poly(Ethylene-Co-Propylene Macromonomer)s: Synthesis and Evidence for Starlike Conformations in Dilute Solution*", Macromolecules, 2008, vol. 41, pp. 559-567.
Rossi et al., "*End Groups in 1-Butene Polymerization Via Methylaluminoxane and Zirconocene Catalyst*", Macromolecules, 1995, vol. 28, pp. 1739-1749.
Rulhoff et al., "*Synthesis and Characterization of Defined Branched Poly(propylene)s with Different Microstructures by Copolymerization of Propylene and Linear Ethylene Oligomers (C$_{n=26-28}$) with Metallocenes/MAO Catalysts*", Macromolecules, 2006, vol. 16, pp. 1450-1460.
Scherman et al., "*Synthesis and Characterization of Stereoregular Ethylene-Vinyl Alcohol Copolymers Made by Ring-Opening Metathesis Polymerization*", Macromolecules, 2005, vol. 38, pp. 9009-9014.
Seayed et al., "*Hydroaminomethylation of Olefins Using a Rhodium Carbene Catalyst*", Tetrahedron Letters, 2003, vol. 44, No. 8, pp. 1679-1683.
Segawa et al., "*Catalytic Hydroaminoalkylation of Alkene*", Yuki Gosei Kagaku Kyokaishi, 2009, vol. 67, No. 8, pp. 834-844. (Abstract only).
Shiono et al., "*Additive Effects of Trialkylaluminum on Propene Polymerization with (t-BuNSiMe$_2$Flu)TiMe$_2$-Based Catalysts*", Applied Catalysis A: General, 2000, vol. 200, pp. 145-152.
Shiono et al., "*Copolymerization of Atactic Polypropene Macromonomer with Propene by an Isospecific Metallocene Catalyst*", Macromolecules, 1999, vol. 32, pp. 5723-5727.
Sill et al., "*Bis-Dendritic Polyethylene Prepared by Ring-Opening Metathesis Polymerization in the Presence of Bis-Dendritic Chain Transfer Agents*", Journal of Polymer Science: Part A: Polymer Chemistry, 2005, vol. 43, pp. 5429-5439.
Small et al., "*Polymerization of Propylene by a New Generation of Iron Catalysts: Mechanisms of Chain Initiation, Propagation, and Termination*", Macromolecules, 1999, vol. 32, pp. 2120-2130.
Stadler et al., "*Long-Chain Branches in Syndiotactic Polypropene Induced by Vinyl Chloride*", Macromolecular Chemistry and Physics, 2010, vol. 211, pp. 1472-1481.
Sun et al., "*Effect of Short Chain Branching on the Coil Dimensions of Polyolefins in Dilute Solution*", Macromolecules, 2001, vol. 34, pp. 6812-6820.
Sunderhaus et al., "*Oxidation of Carbon-Silicon Bonds: The Dramatic Advantage of Strained Siletanes*", Organic Letters, 2003, vol. 5, No. 24, pp. 4571-4573.
Switek et al., "*ABA Triblock Copolymers with a Ring-Opening Metathesis Polymerization/Macromolecular Chain-Transfer Agent Approach*", Journal of Polymer Science: Part A: Polymer Chemistry, 2007, vol. 45, pp. 361-373.
Thomas et al., "*Synthesis of Telechelic Polyisoprene via Ring-Opening Metathesis Polymerization in the Presence of Chain Transfer Agent*", Macromolecules, 2010, vol. 43, pp. 3705-3709.
Wei et al., "*Aufbaureaktion Redux: Scalable Production of Precision Hydrocarbons from AlR$_3$ (R=Et or iBu) by Dialkyl Zinc Mediated Ternary Living Coordinative Chain-Transfer Polymerization*", Angewandte Chemie Inernational Edition, 2010, vol. 49, pp. 1768-1772.
Weng et al., "*Long Chain Branched Isotactic Polypropylene*", Macromolecules, 2002, vol. 35, pp. 3838-3843.
Weng et al., "*Synthesis of Vinly-Terminated Isotactic Poly(Propylene)*", Macromol. Rapid Commun., 2000, vol. 21, pp. 1103-1107.
Yang et al., "*Catatonic Metallocene Polymerization Catalysts, Synthesis and Properties of the First Base-Free Zirconocene Hydride*", Angewandte Chemie International Edition Engl., 1992, vol. 31, pp. 1375-1377.
Yin et al., "*Scope and Mechanism of Allylic C-H Amination of Terminal Alkenes by the Palladium/PhL(OPiv)$_2$ Catalyst System: Insights into the Effect of Naphthoquinone*", JACS, 2010, vol. 132, pp. 11978-11987.

(56) References Cited

OTHER PUBLICATIONS

Zhang et al., "Functionalization of Polyolefins Through Catalytic Hydrosilylation and Imidation Reactions", ANTEC, 2005, pp. 2686-2690.

Balboni et al., $C_2$-Symmetric Zirconocenes for High Molecular Weight Amorphous Poly(propylene), Macromolecular Chemistry and Physics, 2001, vol. 202, No. 10, pp. 2010-2028.

Brzezinska et al., "Synthesis of ABA Triblock Copolymers via Acyclic Diene Metathesis Polymerization and Living Polymerization of a-Amino Acid-N-Carboxyanhydrides", Macromolecules, 2001, vol. 34, pp. 4348-4354.

Bujadoux et al., Use of Bridged and Non-bridged Metallocene Catalysts in High Pressure/High Temperature Ethylene/α-olefin Copolymerization, Metallocene Polymers, 1995, pp. 377-402.

Koo et al., "Silicon-Modified Ziegler-Natta Polymerization. Catalytic Approaches to Silyl-Capped and Silyl-Linked Polyolefins Using "Single-Site" Cationic Ziegler-Natta Catalysts", JACS, 1999, vol. 121, pp. 8791-8802.

Passaglia et al., "Grafting of Diethyl Maleate and Maleic Anhydride Onto Styrene-b-(Ethylene-co-1-Butene)-b-Styrene Triblock Copolymer (SEBS)", Polymer, 2000, vol. 41, pp. 4389-4400.

Quirk et al., "Anionic Synthesis of Secondary Amine Functionalized Polymers by Reaction of Polymeric Organolithiums with N-Benzylidenemethylamine", Macromolecular Chemistry and Physics, 2002, vol. 203, pp. 1178-1187.

Rybak et al., "Acyclic Diene Metathesis with a Monomer with a Monomer from Renewable Resources: Control of Molecular Weight and One-Step Preparation of Block Copolymers", ChemSusChem, 2008, vol. 1, pp. 542-547.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2,6-Bis(Imino)Pyridyl Ligands: Synthesis, Structures, and Polymerization Studies, Journal of the American Chemical Society, 1999, vol. 121, No. 38, pp. 8728-8740.

Chen et al., Preparation of Epoxy-modified Polyethylene by Graft Extrusion and its Applications to Polyphenylene Sulfide Alloys as a Compatibilizer, Reactive & Functional Polymers, 2008, vol. 68, No. 9, pp. 1307-1313.

Cossy et al., "Cross-Metathesis reaction. Generation of Highly Functionalized Olefins from Unsaturated Alcohols", Journal of Organometallic Chemistry, 2001, vol. 634, Issue 2, pp. 216-221.

Hansell et al., Additive-Free Clicking for Polymer Functionalization and Coupling by Tetrazine-Norbornene Chemistry, Journal of the American Chemical Society, 2011, vol. 133, No. 35, pp. 13828-13831.

Liu et al., Kinetics of Initiation, Propagation, and Termination for the [rac-($C_2H_4$(1-indenyl)2)ZrMe]{MeB($C_6F_5$)3}-Catalyzed Polymerization of 1-Hexene, Journal of the American Chemical Society, 2001, vol. 123, pp. 11193-11207.

Nagai et al., Novel Well-defined Funcationalized Polyolefins and Polyolefin polar Polymer Block Copolymers: Formations and Their Features, Poly Preprints, 2008, vol. 49, No. 2, 776-777.

Rodriguez et al., Poly(4-vinylpyridazine). First Synthesis, Characterization and Properties, Polymeric Materials Science and Engineering, Proceedings of the ACS Division of Polymeric Materials Science and Engineering, 1990, vol. 63, pp. 376-382 (Abstract).

Shiono et al., Copolymerization of poly(propylene) macromonomer with ethylene by (tert-butanamide)dimethyl(tetramethyl-qscyclopentadienyl) silane titanium dichloride/methylaluminoxane catalyst, Macromol. Chem. Phys., 1997, vol. 198, pp. 3229-3237.

Weng et al., Synthesis of Long-Chain Branched Propylene Polymers via Macromonomer Incorporation, Macromol. Rapid Commun., 2001, vol. 22, No. 18, pp. 1488-1492.

Xu et al., Ethylene Copolymerization with 1-Octene Using a 2-Methylbenz[e]indenyl-Based ansa-Monocyclopentadienylamido Complex and Methylaluminoxane Catalyst, Macromolecules, 1998, vol. 31, pp. 4724-4729.

\* cited by examiner

US 8,669,326 B2

AMINE FUNCTIONALIZED POLYOLEFIN AND METHODS FOR PREPARATION THEREOF

STATEMENT OF RELATED CASES

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); 12/488,093, filed on Jun. 19, 2009 (Published as WO 2009/155517); and U.S. Ser. No. 12/642,453, filed Dec. 18, 2009; which is a continuation-in-part application of U.S. Ser. No. 12/533,465, filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,280, filed Mar. 25, 2011, entitled "Novel Catalysts and Methods of Use Thereof to Produce Vinyl Terminated Polymers";

b) U.S. Ser. No. 13/072,279, filed Mar. 25, 2011, entitled "Enhanced Catalyst Performance for Production of Vinyl Terminated Propylene and Ethylene/Propylene Macromers";

c) U.S. Ser. No. 13/072,383, filed Mar. 25, 2011, entitled "Diblock Copolymers Prepared by Cross Metathesis";

d) U.S. Ser. No. 13/072,261, filed Mar. 25, 2011, entitled "Amphiphilic Block Polymers Prepared by Alkene Metathesis";

e) U.S. Ser. No. 13/072,288, filed Mar. 25, 2011, entitled "Vinyl Terminated Higher Olefin Polymers and Methods to Produce Thereof";

f) U.S. Ser. No. 3/072,305, filed Mar. 25, 2011, entitled "Hydrosilylation of Vinyl Macromers with Metallocenes";

g) U.S. Ser. No. 13/072,432, filed Mar. 25, 2011, entitled "Olefin Triblock Polymers via Ring-Opening Metathesis Polymerization";

h) U.S. Ser. No. 13/072,330, filed Mar. 25, 2011, entitled "Block Copolymers from Silylated Vinyl Terminated Macromers";

i) U.S. Ser. No. 13/072,249, filed Mar. 25, 2011, entitled "Vinyl Terminated Higher Olefin Copolymers and Methods to Produce Thereof"; and j) U.S. Ser. No. 61/467,681, filed Mar. 25, 2011, entitled "Branched Vinyl Terminated Polymers and Methods for Production Thereof".

FIELD OF THE INVENTION

This invention relates to functionalization of vinyl terminated polyolefins by reaction with an alkyl amine and a transition metal amide catalyst.

BACKGROUND OF THE INVENTION

Methods for the production of polyolefins with end-functionalized groups are typically multi-step processes that often create unwanted by-products and waste of reactants and energy. For reviews of methods to form end-functionalized polyolefins, see: (a) S. B. Amin and T. J. Marks *Angew. Chem. Int. Ed.* 2008, 47, pp. 2006-2025; (b) T. C. Chung *Prog. Polym. Sci.* 2002, 27, pp. 39-85; (c) R. G. Lopez, F. D'Agosto, C. Boisson *Prog. Polym. Sci.* 2007, 32, pp. 419-454. A process with a reduced number of steps, even one step, would be desirable.

U.S. Pat. No. 4,110,377 discloses secondary aliphatic amines alkylated with alpha-olefins, such as ethylene, propylene, hexene, and undecene. Likewise, several literature references disclose hydroaminoalkylation of olefins using various catalysts (See, J. Am. Chem. Soc. 2008, 130, pp. 14940-14941; J. Am. Chem. Soc. 2007, 129, pp. 6690-6691; Angew. Chem. Int. Ed. 2009, 48, pp. 8361-8365; Angew. Chem. Int. Ed. 2009, 48, pp. 4892-4894; *Yuki Gosei Kagaku Kyokaishi* (2009), 67(8), pp. 843-844; *Angewandte Chemie, International Edition* (2009), 48(6), pp. 1153-1156; *Tetrahedron Letters* (2003), 44(8), pp. 1679-1683; *Synthesis* (1980), (4), pp. 305-306).

None of the above references however disclose functionalization of polyolefins, particularly polyolefins having Mn's over 500 g/mol having large amounts of vinyl terminal groups.

U.S. Ser. No. 12/487,739, filed Jun. 19, 2009 discloses certain vinyl terminated polymers that are functionalized for use in lubricant applications.

U.S. Ser. No. 12/143,663, filed on Jun. 20, 2008 discloses certain vinyl terminated polymers that are functionalized in U.S. Ser. No. 12/487,739, filed Jun. 19, 2009.

U.S. Ser. No. 12/488,093, filed Jun. 19, 2009 discloses a process to functionalize propylene homo- or copolymer comprising contacting an alkene metathesis catalyst with a heteroatom containing alkene and a propylene homo- or copolymer having terminal unsaturation.

Further, synthesis of vinyl-terminated isotactic poly(propylene) has been described in Weiqing Weng, Eric J. Markel, Armenag H. Dekmezian, Macomol Rapid Commun 2000 21, pp. 1103-1107.

Thus, there is a need to develop a means to provide functionalized polyolefins (particularly end-functionalized) by efficient reactions, particularly reactions with good conversion, preferably under mild reaction conditions with a minimal number of steps, preferably one or two steps. The instant invention's use of transition metal amide catalysts to introduce amine groups is both a commercially economical and an "atom-economical" route to end-functionalized polyolefins.

End-functionalized polyolefins that feature a chemically reactive or polar end group are of interest for use in a broad range of applications as compatibilizers, tie-layer modifiers, surfactants, adhesives, and surface modifiers. Herein is described a novel method for their production by the reaction of vinyl-terminated polyolefins with alkyl amines in the presence of a transition metal amide catalyst. This method is useful for a range of vinyl terminated polyolefins, including isotactic polypropylene (iPP), atactic polypropylene (aPP), ethylene propylene copolymer (EP), polyethylene (PE), and particularly propylene copolymers with larger alpha-olefin comonomers such as butene, hexene octene, etc. The vinyl terminated polyolefin useful herein can be linear or branched.

SUMMARY OF THE INVENTION

This invention relates to a process to functionalize polyolefins comprising contacting a transition metal amide catalyst with an alkyl amine (such as a secondary amine), and one or more vinyl terminated polyolefins.

This invention further relates to amine-functionalized polyolefins, preferably represented by the formula:

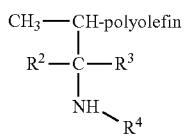

where $R^2$ and $R^3$ are each, independently, hydrogen or a $C_1$-$C_{20}$ group, preferably a $C_1$ to $C_{20}$ alkyl group; $R^4$ is an aryl or alkyl group, preferably a $C_1$-$C_{20}$ alkyl or $C_6$ to $C_{20}$ aryl group; and polyolefin is a homopolymer or copolymer of one or more $C_2$ to $C_{40}$ olefin.

Alternately, this invention relates to amine-functionalized polyolefins represented by the formula:

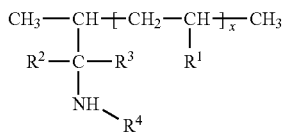

where $R^1$ is either hydrogen, or a $C_1$ to $C_{18}$ group (preferably methyl, ethyl, butyl, hexyl, or octyl); $R^2$ and $R^3$ are each, independently, hydrogen or a $C_1$-$C_{20}$ group, preferably a $C_1$ to $C_{20}$ alkyl group; $R^4$ is an aryl, substituted aryl, alkyl or substituted alkyl group, preferably a $C_1$-$C_{20}$ alkyl or substituted alkyl, or $C_6$ to $C_{20}$ aryl or substituted aryl group; and x is a number greater than 12, preferably from 12 to 5000, preferably from 15 to 2500, preferably 20 to 2000.

DETAILED DESCRIPTION

Figure 1:
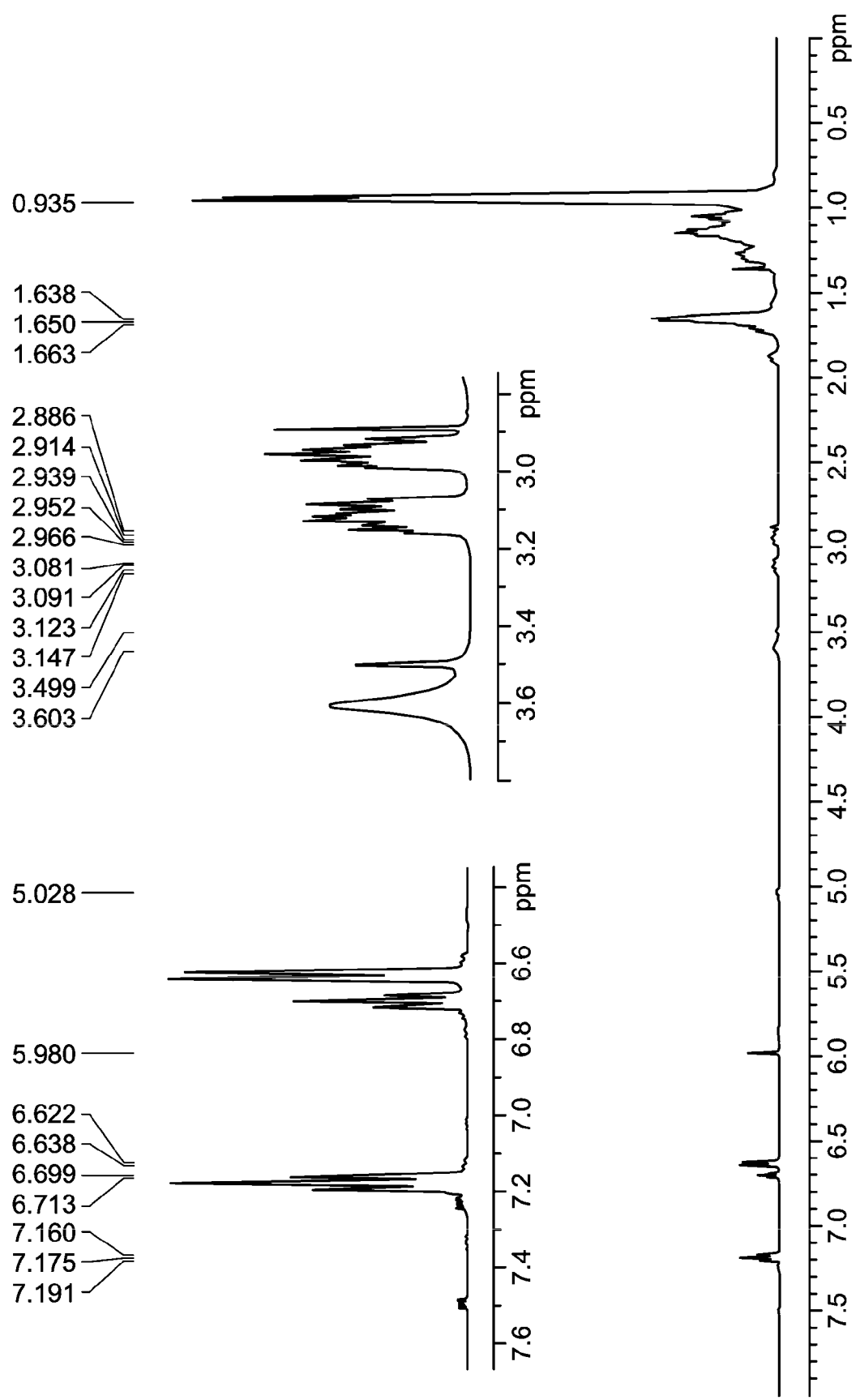
FIG. 1 is a 500 MHz $^1$H NMR spectrum (120° C. in $D_2$-tetrachloroethane) of the product formed by the Ta(NMe$_2$)$_5$ catalyzed reaction of vinyl-terminated aPP with N-methyl aniline (Example 1 from Table 1).

A propylene polymer is a polymer having at least 50 mol % of propylene and an ethylene polymer is a polymer having at least 50 mol % ethylene. An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less).

As used herein, Mn is number average molecular weight (measured by $^1$H NMR unless stated otherwise), Mw is weight average molecular weight (measured by Gel Permeation Chromatography), and Mz is z average molecular weight (measured by Gel Permeation Chromatography), wt % is weight percent, and mol % is mole percent. Unless otherwise noted, molecular weight distribution (MWD) is Mw (measured by Gel Permeation Chromatography) divided by Mn (measured by $^1$H NMR). Unless otherwise noted, all molecular weight units (e.g., Mw, Mn, Mz) are g/mol.

A "higher" alpha olefin is a linear, branched or cyclic alpha olefin having at least 4 carbon atoms. For purposes of this invention ethylene and styrene are alpha olefins.

As used herein, the numbering scheme for the Periodic Table of the Elements groups is the new notation as set out in CHEMICAL AND ENGINEERING NEWS, 63(5), 27 (1985).

Substituted radicals (such as substituted alkyls or substituted aryls) are radicals in which at least one hydrogen atom has been substituted with at least heteroatom, or at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one non-hydrocarbon atom or group has been inserted within the radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$—, and the like, where R* is independently a hydrocarbyl or halocarbyl radical, and two or more R* may join together to form a substituted or unsubstituted saturated, partially unsaturated or aromatic cyclic or polycyclic ring structure.

The following abbreviations may used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, Cp is cyclopentadienyl, Ind is indenyl, Flu is fluorenyl, pMe is para-methyl, Ar* is 2,6-diisopropylaryl, Bn is benzyl, THF is tetrahydrofuran, RT or rt is room temperature and tol is toluene.

In a preferred embodiment, this invention relates to a process to functionalize polyolefins comprising contacting a transition metal amide catalyst with an alkyl amine (such as a secondary amine, diamine or triamine), and one or more vinyl terminated polyolefins, wherein:

1) the transition metal amide is represented by the formula: $M(NR^5R^6)_xX_yL_z$, where M is a group 3, 4, 5, or 6 transition metal or a lanthanide or actinide metal of the Periodic Table of the Elements, such as scandium, yttrium, titanium, zirconium, hafnium, vanadium, niobium, tantalum, chromium, molybdenum, tungsten, cerium, thorium, or uranium, preferably tantalum or zirconium, preferably tantalum; $R^5$ and $R^6$ are each, independently, hydrogen or a substituted or unsubstituted alkyl or a substituted or unsubstituted aryl group, preferably a substituted or unsubstituted alkyl group containing between 1-20 carbon atoms or a substituted or unsubstituted aryl containing from 6 to 20 carbon atoms, provided that at least one of $R^5$ and $R^6$ is not hydrogen; x+y is 3, 4, 5, or 6; x is 1, 2, 3, 4, 5, 6; y is 0, 1, 2, 3, or 4; z is 0, 1, 2, or 3; X is an anionic ligand selected from halides, alkoxides, phenolates, amidinates, amidates, sulfonates, acetate, and sulfonates; L is a neutral Lewis base, such as tetrahydrofuran or dimethylamine;

2) the alkyl amine is preferably a $C_2$ to $C_{40}$ secondary amine, represented by the formula: $HNR^9{}_2$, wherein each $R^9$ is, independently a group containing from 1 to 20 carbon atoms, preferably a $C_1$ to $C_{20}$ alkyl group; preferably the secondary amine is represented by the formula: $R^4NHCH(R^2)(R^3)$, where $R^2$ is, independently, hydrogen, a $C_1$-$C_{20}$ group, preferably a $C_1$-$C_{20}$ alkyl group, $R^3$ is, independently, a $C_1$-$C_{20}$ group, preferably a $C_1$-$C_{20}$ alkyl group, and $R^4$ is an aryl or alkyl group, preferably a $C_1$-$C_{20}$ alkyl or a $C_6$ to $C_{20}$ aryl group; and 3) the vinyl terminated polyolefin has at least 30% allyl chain ends (relative to total unsaturations), preferably at least 40%, preferably at least 50%, preferably at least 60%, preferably at least 70%, preferably at least 80%, preferably at least 90%, preferably at least 95%.

Process to Functionalize Polyolefins

This invention relates to a process to functionalize polyolefins comprising contacting a transition metal amide catalyst with a secondary amine, and one or more vinyl terminated polyolefins.

The reactants are typically combined in a reaction vessel at a temperature of 40 to 300° C. (preferably 60 to 220° C., preferably 80 to 220° C., preferably 100 to 220° C., preferably 140 to 200° C.). Likewise, the reactants are typically combined at a pressure up to 1000 MPa (preferably 0.5 to 500 MPa, preferably 1 to 250 MPa). Likewise, the reactants are typically combined at a residence time of 1 minute to 200 hours, (preferably 10 minutes to 200 hours, preferably 30 minutes to 24 hours, preferably 60 minutes to 12 hours).

Typically, from about 0.7 to about 4.0, preferably 0.8 to 2.6, preferably from about 1.0 to about 2.0, and most preferably from about 1.1 to about 1.7 moles of the alkyl amine are charged to the reactor per mole of vinyl-terminated polyolefin charged.

Typically, 0.00001 to 0.1 moles, preferably 0.0001 to 0.02 moles, preferably 0.0005 to 0.01 moles of transition metal amide catalyst are charged to the reactor per mole of vinyl-terminated polyolefin charged.

The functionalization process is typically a solution process or a bulk process, although it may be a high pressure process. Homogeneous processes (such as a solution process) are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately, no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. In a preferred embodiment, the feed concentration for the process is 60 volume % solvent or less, preferably 40 volume % or less, preferably 20 volume % or less, preferably from 1 to 20 volume %. Alternately the solvent is present at 0 volume %.

The process may be batch, semi-batch or continuous. As used herein, the term continuous means a system that operates without interruption or cessation. Hence, a continuous process is one where there is continuous addition to, and withdrawal of reactants and products from, the reactor system. Continuous processes can be operated in steady state, i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

In a preferred embodiment, the productivity of the process is at least 100 g of amine-functionalized polyolefin per mmol of catalyst per hour, preferably at least 5000 g/mmol/hour, preferably at least 10,000 g/mmol/hr, preferably at least 300,000 g/mmol/hr.

In a preferred embodiment, the yield of the catalyst is at least 50 mols of amine functionalized polyolefin per mol of metal amide catalyst, preferably 100 mols of amine functionalized polyolefin per mol of metal amide catalyst, preferably 200 mols of amine functionalized polyolefin per mol of metal amide catalyst.

This invention further relates to a process, preferably an in-line process, preferably a continuous process, to produce functionalized polyolefin, comprising introducing olefin monomer (such as a $C_1$ to $C_{20}$ alkyl, preferably ethylene and/or propylene) and catalyst system (as described below) into a reactor, obtaining a reactor effluent containing vinyl terminated polyolefin, optionally removing (such as flashing off) solvent, unused monomer and/or other volatiles, obtaining vinyl terminated polyolefin (such as those described herein), introducing vinyl terminated polyolefin, transition metal amide catalyst (as described herein) and alkyl amine (as described herein) into a reaction zone (such as a reactor, an extruder, a pipe and/or a pump) and obtaining functionalized polyolefin (such as those described herein).

The processes described herein can be carried out in any reactor, such as a continuous stirred tank reactor, batch reactor, tubular, plug flow reactor, reactive extruder, pipe or pump or more than one reactor operated in series or parallel. These reactors may have or may not have internal cooling and the monomer feed may or may not be refrigerated. The polymerization and functionalization processes described herein operate well in autoclave and tubular reactors. Typically, useful autoclave reactors have length-to-diameter ratios of 1:1 to 20:1 and are fitted with a high-speed (up to 1500 RPM) multiblade stirrer. Autoclave pressures are typically less than 260 MPa. When the autoclave has a low length-to-diameter ratio (such as less than 4) reactants are typically injected at only one position. But injection at two or more positions in the autoclave is also possible. For instance, in reactors where the length-to-diameter ratio is around 4-20, the reactor can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for plug flow or back mixing, largely independently, in the separate zones. Two or more autoclaves with one or more zones can connect in series to tailor product structure or properties.

Tubular reactors are also well suited for use in this invention. Preferred tubular reactors are fitted with external cooling and one or more injection points along the (tubular) reaction zone. As in autoclaves, these injection points serve as entry points for reactants mixtures thereof. In tubular reactors, external cooling allows for increased conversion relative to an autoclave, where the low surface-to-volume ratio hinders any significant heat removal. Tubular reactors have a special outlet valve that can send a pressure shockwave backward along the tube. The shockwave helps dislodge any residue that has formed on reactor walls during operation. Another way of addressing wall deposits is to fabricate the tube with smooth, unpolished internal surfaces. Preferred tubular reactors can operate at pressures up to 360 MPa and preferably have lengths of 100-2000 meters and internal diameters of usually less than 10 cm.

In another embodiment, the amine-functionalized polyolefins described herein can be further converted into tertiary amine-functionalized derivatives (e.g., polyolefin-$NR^iR^jR^k$, where $R^i$, $R^j$, $R^k$ are each an alkyl or aryl group) or ammonium-functionalized derivatives (e.g., polyolefin-$NR^w R^x R^y R^z$, where $R^w$, $R^x$, $R^y$, $R^z$ are each a hydrogen, alkyl, or aryl group, preferably a $C_1$ to $C_{100}$ alkyl or a $C_6$ to $C_{100}$ aryl) using typical organic functional group transformation chemistry such as that described in Organic Chemistry 2nd Edition, 1991, Prentice Hall, author L. G. Wade, Jr.).

Transition Metal Amide Catalysts

Useful transition metal amide catalysts include group 3, 4, 5, or 6 metal amidos and group 3, 4, 5, or 6 complexes that react (typically with amines and/or group 1 or 2 metal amides) to form metal amidos, examples of the latter include tantalum alkyls, mixed tantalum alkyl chlorides, group 4 and 5 metal imidos, $TaMe_5$, $TaMe_3Cl_2$, $TaBn_5$, $ZrBn_4$, and $ZrBn_2Cl_2$ $(OEt_2)_n$, where n is 0 to 10 and Bn is benzyl, Me is methyl, and Et is ethyl. In particular, group 4 and 5 metal complexes containing at least two amido groups where an amido is defined as an anionic ligand $R^5R^6N$, with $R^5$ and $R^6$ being independently selected from unsubstituted or substituted aryls or unsubstituted or substituted alkyls, where $R^5$ and $R^6$ can be joined in a ring system. Two amidos may also be covalently linked to give a transition metal amide catalyst containing a diamide group.

In a preferred embodiment, the transition metal amide catalyst is represented by the formula: $M(NR^5R^6)_x X_y L_z$, where M is a group 3, 4, 5, or 6 transition metal or a lanthanide or actinide metal of the Periodic Table of the Elements, preferably a group 4 or 5 metal, preferably a group 5 metal, preferably scandium, yttrium, titanium, zirconium, hafnium, vanadium, niobium, tantalum, chromium, molybdenum, tungsten, cerium, thorium, or uranium, preferably tantalum or zirconium, preferably tantalum;

$R^5$ and $R^6$ are each, independently hydrogen or a substituted or unsubstituted alkyl or substituted or unsubstituted aryl group, preferably a substituted or unsubstituted alkyl group containing between 1-20 carbon atoms (preferably 1 to 10 carbon atoms, preferably 1 to 6 carbon atoms) or a substituted or unsubstituted aryl containing from 6 to 20 carbon atoms (preferably 6 to 15 carbon atoms, preferably 6 to 10 carbon atoms), preferably $R^5$ and $R^6$ are each, independently hydrogen, methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, xylyl, (preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl), where $R^5$ and $R^6$ can be joined in a ring system, preferably a substituted or unsubstituted 5 or 6 membered ring aromatic or non-aromatic ring, such as substituted or unsubstituted piperidinyl, or substituted or unsubstituted pyrazolyl;

provided that at least one of $R^5$ and $R^6$ is not hydrogen, preferably both of $R^5$ and $R^6$ are not hydrogen;

x+y is 3, 4, 5, or 6 (preferably x+y is 4 or 5, preferably 5);

x is 1, 2, 3, 4, 5, 6 (preferably x is 2, 3, 4 or 5, preferably 5);

y is 0, 1, 2, 3, or 4 (preferably y is 0, 2 or 3, preferably 0 or 2);

z is 0, 1, 2, or 3;

L is a neutral Lewis base, such as tetrahydrofuran or dimethylamine; and

X is an anionic ligand, such as one or more halides, alkoxides, phenolates, amidinates, amidates, sulfonates, acetate, or sulfonates.

In a preferred embodiment, x+y is equal to the oxidation number of M, preferably the oxidation number of M is 3, 4, 5, or 6, preferably 4 or 5, preferably 5.

In a preferred embodiment, z is 0. In another preferred embodiment, x is 0 and z is 0.

In a preferred embodiment, M is Ta, $R^5$, and $R^6$ are, independently, methyl, ethyl, propyl, butyl, or hexyl, x is 5 or 2, y is 0 or 3, z is 0.

In a preferred embodiment, $NR^5R^6$ is a substituted or unsubstituted piperidinyl group, preferably substituted with one or more $C_1$ to $C_{20}$ alkyl groups.

In a preferred embodiment, M is Ta, x is 5 or 2, y is 0 or 3, z is 0, and $NR^5R^6$ is a substituted or unsubstituted piperidinyl group, preferably substituted with one or more $C_1$ to $C_{20}$ alkyl groups.

A substituted piperidinyl is a piperidine group where at least one hydrogen from the piperidine ring (either from a carbon or nitrogen atom) has been replaced by a hydrocarbyl group, a heteroatom or a heteroatom containing hydrocarbyl group. Preferred hydrocarbyl groups include methyl, ethyl, propyl, butyl, hexyl, and octyl. In some embodiments, the hydrocarbyl substituents on the piperidine group can form rings.

A substituted pyrazolyl is a pyrazol group where at least one hydrogen from the pyrazol ring (either from a carbon or nitrogen atom) has been replaced by a hydrocarbyl group, a heteroatom or a heteroatom containing hydrocarbyl group. Preferred hydrocarbyl groups include methyl, ethyl, propyl, butyl, hexyl, and octyl. In some embodiments, the hydrocarbyl substituents on the pyrazol group can form rings.

Other useful transition metal amide catalysts include the compounds described in J. Am. Chem. Soc. 2008, 130, pp. 14940-14941; J. Am. Chem. Soc. 2007, 129, pp. 6690-6691; Angew. Chem. Int. Ed. 2009, 48, pp. 8361-8365; and Angew. Chem. Int. Ed. 2009, 48, pp. 4892-4894.

In a preferred embodiment, the transition metal amide catalyst is one or more of: pentakis(dimethylamido)tantalum (Ta(NMe$_2$)$_5$), Ta(NEt$_2$)$_2$Cl$_3$, Zr(NMe$_2$)$_4$, Hf(NMe$_2$)$_4$, Zr(NEt$_2$)$_4$, Hf(NEt$_2$)$_2$Cl$_2$, and Zr(NMe$_2$)$_2$Cl$_2$(dimethoxyethane).

Alkyl Amines

Alkyl amines useful in the process described herein include secondary amines which have at least one hydrogen bound to a carbon that is directly bound to the amine nitrogen. Examples of secondary amines that have at least one hydrogen bound to a carbon that is directly bound to the amine nitrogen include N-methylaniline, N-ethylaniline, and diethyl amine.

Preferably, the secondary amine is a $C_2$ to $C_{40}$ secondary amine, represented by the formula: $HNR^9{}_2$, wherein each $R^9$ is, independently, a substituted or unsubstituted hydrocarbyl group containing from 1 to 20 carbon atoms, preferably from 1 to 10 carbon atoms, preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more C1 to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl. Preferably the secondary amine is represented by the formula: $R^4NHCH(R^2)(R^3)$, where:

$R^2$ is, independently, hydrogen, a $C_1$-$C_{20}$ group, preferably a $C_1$-$C_{20}$ alkyl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl;

$R^3$ is, independently, a $C_1$-$C_{20}$ group, preferably a $C_1$-$C_{20}$ alkyl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl; and $R^4$ is an aryl or alkyl group, preferably a $C_1$-$C_{20}$ alkyl or a $C_6$ to $C_{20}$ aryl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-alkyl-substituted phenyl, 2,4,6-trialkylsubstituted phenyl, 2,5-dialkylsubstituted phenyl.

Particularly preferred secondary amines include N-methyl substituted secondary amines, such as N-methyl aniline and methylhexylamine.

Alkyl amines useful in the process described herein also include diamines represented by the formula: $D_c$-$Q^b$-$(A)_2$, where Q is a group 14 or 15 element, preferably C, N, P, or Si, preferably C or N, preferably N, D is hydrogen, a hydrocarbyl group or A, A is a substituted or unsubstituted primary, secondary or tertiary amine group or a hydrocarbyl containing a substituted or unsubstituted primary, secondary or tertiary amine group, b is the valence of Q and is 3 or 4, and when b is 3, c is 1 and when b is 4, c is 2, where A may be bound to Q via any atom in the A group. Preferred examples of diamines include dimethylhexanediamine.

Alkyl amines useful in the process described also herein include triamines represented by the formula: $D_c$-$Q^b$-$(A)_3$, where Q is a group 14 or 15 element, preferably C, N, P, or Si, preferably C or N, preferably N, D is hydrogen, a hydrocarbyl group or A, A is a substituted or unsubstituted primary, secondary or tertiary amine group or a hydrocarbyl containing a substituted or unsubstituted primary, secondary or tertiary amine group, b is the valence of Q and is 3 or 4, and when b is 3, c is 0 and when b is 4, c is 1, where A may be bound to Q via any atom in the A group. Preferred examples of triamines include $N(CH_2CH_2NMe)_3$.

Vinyl Containing Materials

The process of this invention may be used on any vinyl containing polymer, such as an alpha-olefin-diene copolymer or a polydiene. In a preferred embodiment, the alpha-olefin-diene copolymer has an Mn of 300 g/mol or more (preferably 1000 g/mol or more, preferably from 1500 to 250,000 g/mol) and comprises a $C_2$ to $C_{20}$ alpha olefin (such as ethylene, propylene, butene, hexene, octene and/or decene) and a $C_4$ to $C_{20}$ diene, (such as an alpha-omega diene, preferably, 1,5-hexadiene, 1,7-octadiene, 1,9 decadiene, 1,3-butadiene). In an alternate embodiment, the polydiene polymer has an Mn of 300 g/mol or more (preferably 1000 g/mol or more, preferably from 1500 to 250,000 g/mol) and comprises one or more $C_4$ to $C_{12}$ dienes, (such as an alpha-omega diene, preferably, 1,5-hexadiene, 1,7-octadiene, 1,9 decadiene, 1,3-butadiene). In a preferred embodiment, these amine functionalized alpha-olefin-diene copolymers, and polydienes have at least 5 amine groups per chain, preferably at least 10 amine groups per chain, have at least 15 amine groups per chain, preferably at least 20 amine groups per chain, have at least 30 amine groups per chain, preferably at least 50 amine groups per chain. These amine functionalized alpha-olefin-diene copolymers or polydienes can be used in any applications described herein.

Vinyl Terminated Polyolefins

The process of this invention can also be practiced with Vinyl Terminated Polyolefins. For purposes of this invention and claims thereto "Allyl chain ends" (also referred to as "vinyl termination", "allylic vinyl end group", "vinyl chain ends" or "vinyl content") is defined to be a polymer having at least one terminus represented by formula I:

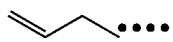

allylic vinyl end group where the "••••" represents the polymer chain. In a preferred embodiment the allyl chain end is represented by the formula II:

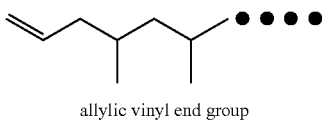

allylic vinyl end group

The amount of allyl chain ends is determined using $^1$H NMR at 120° C. using deuterated tetrachloroethane as the solvent on a 500 MHz machine, and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene polymers in J American Chemical Soc., 114, 1992, pp. 1025-1032 that are useful herein.

"Isobutyl chain end" is defined to be a polymer containing at least 1 mol % propylene and having at least one terminus represented by the formula:

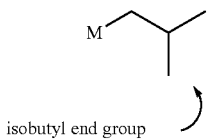

isobutyl end group where M represents the polymer chain. In a preferred embodiment, the isobutyl chain end is represented by one of the following formulae:

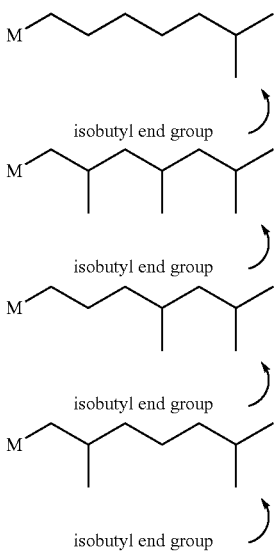

where M represents the polymer chain.

Figure 2:
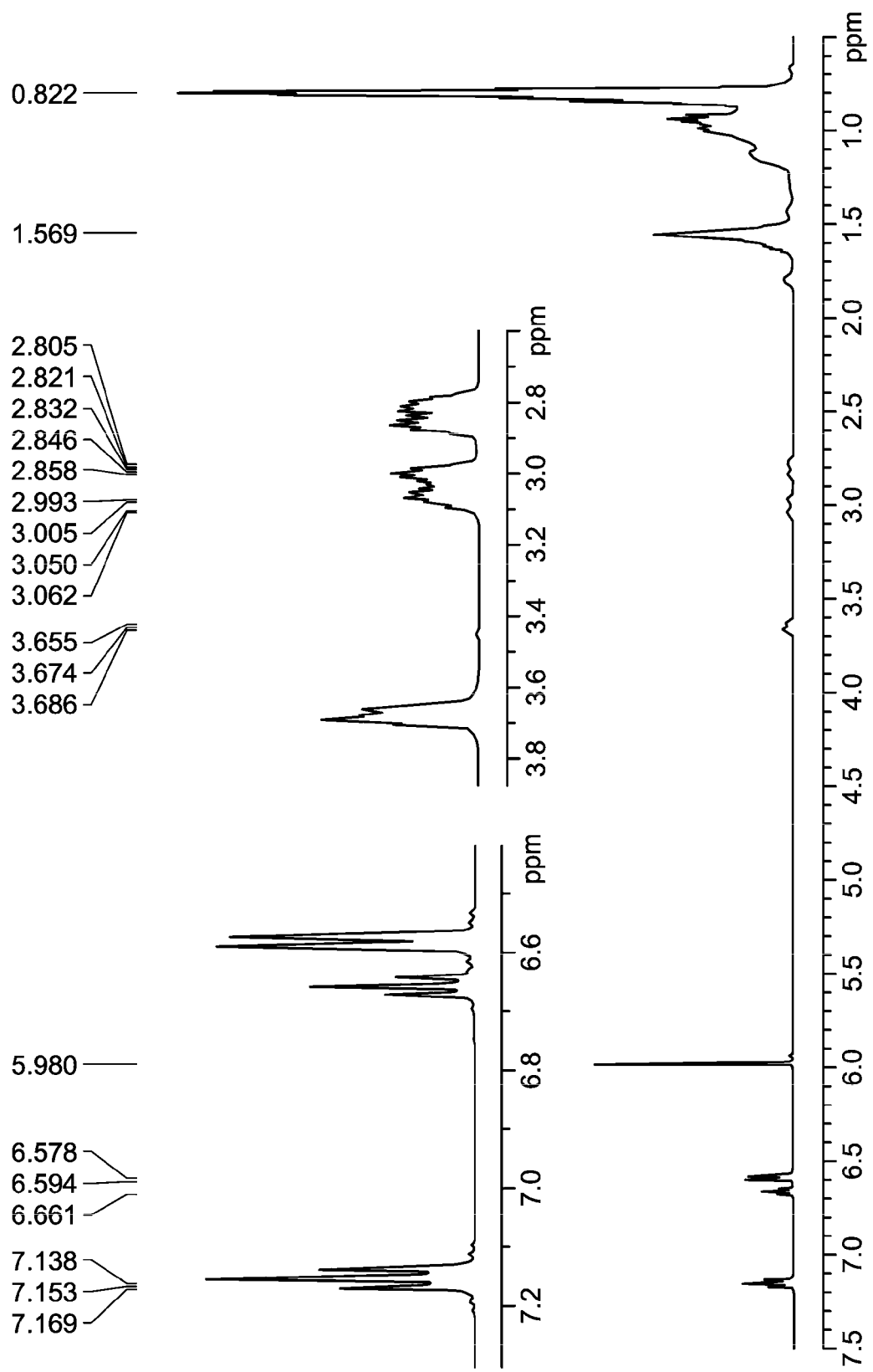
FIG. 2 is a 500 MHz $^1$H NMR spectrum (28° C. in $D_2$-tetrachloroethane) of the product formed by the Ta(NMe$_2$)$_5$ catalyzed reaction of vinyl-terminated aPP with N-methyl aniline (Example 2 from Table 1).
Figure 3:
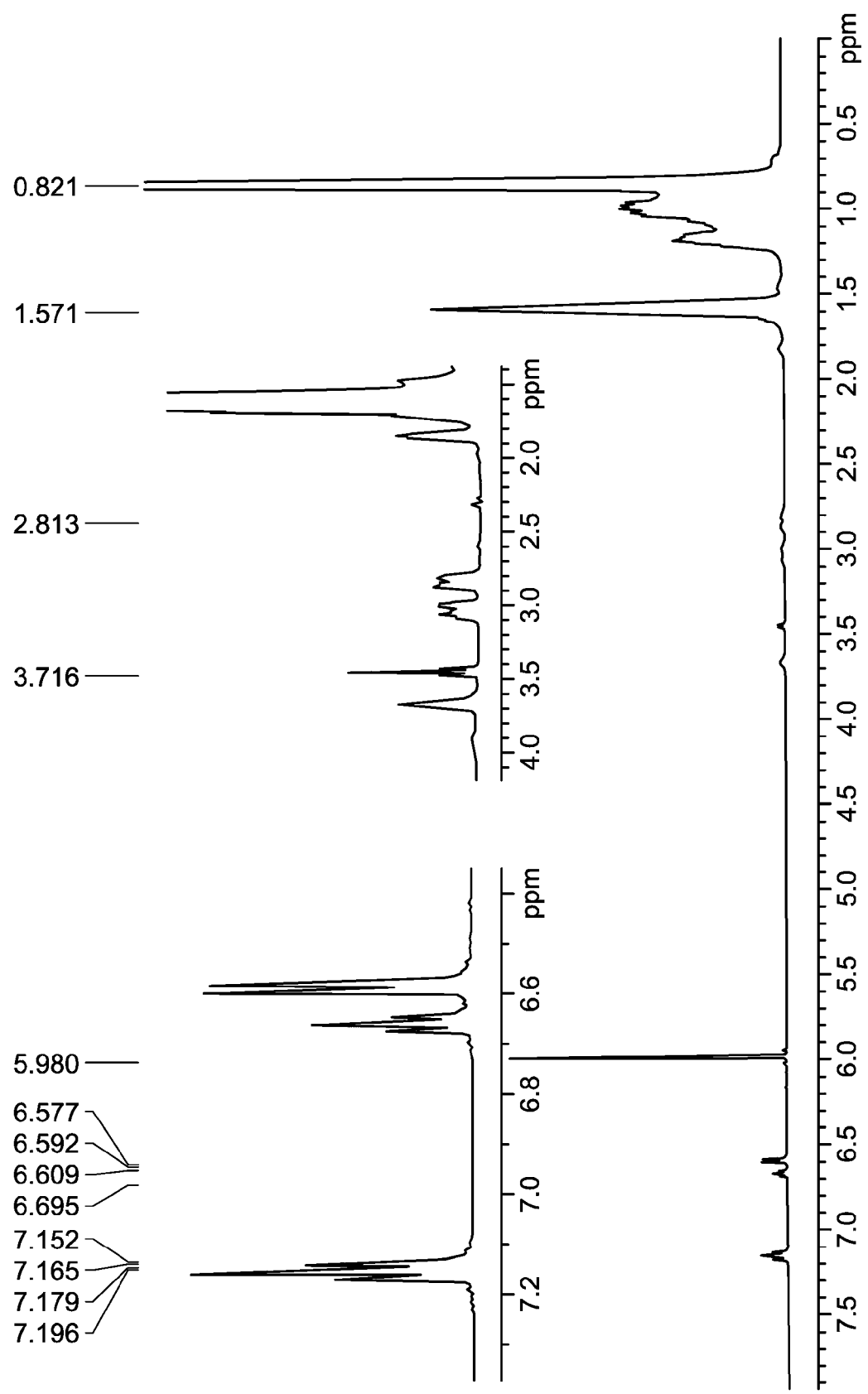
FIG. 3 is a 500 MHz $^1$H NMR spectrum (28° C. in $D_2$-tetrachloroethane) of the product formed by the Ta(NMe$_2$)$_5$ catalyzed reaction of vinyl-terminated aPP with N-methyl aniline (Example 3 from Table 1).
Figure 4:
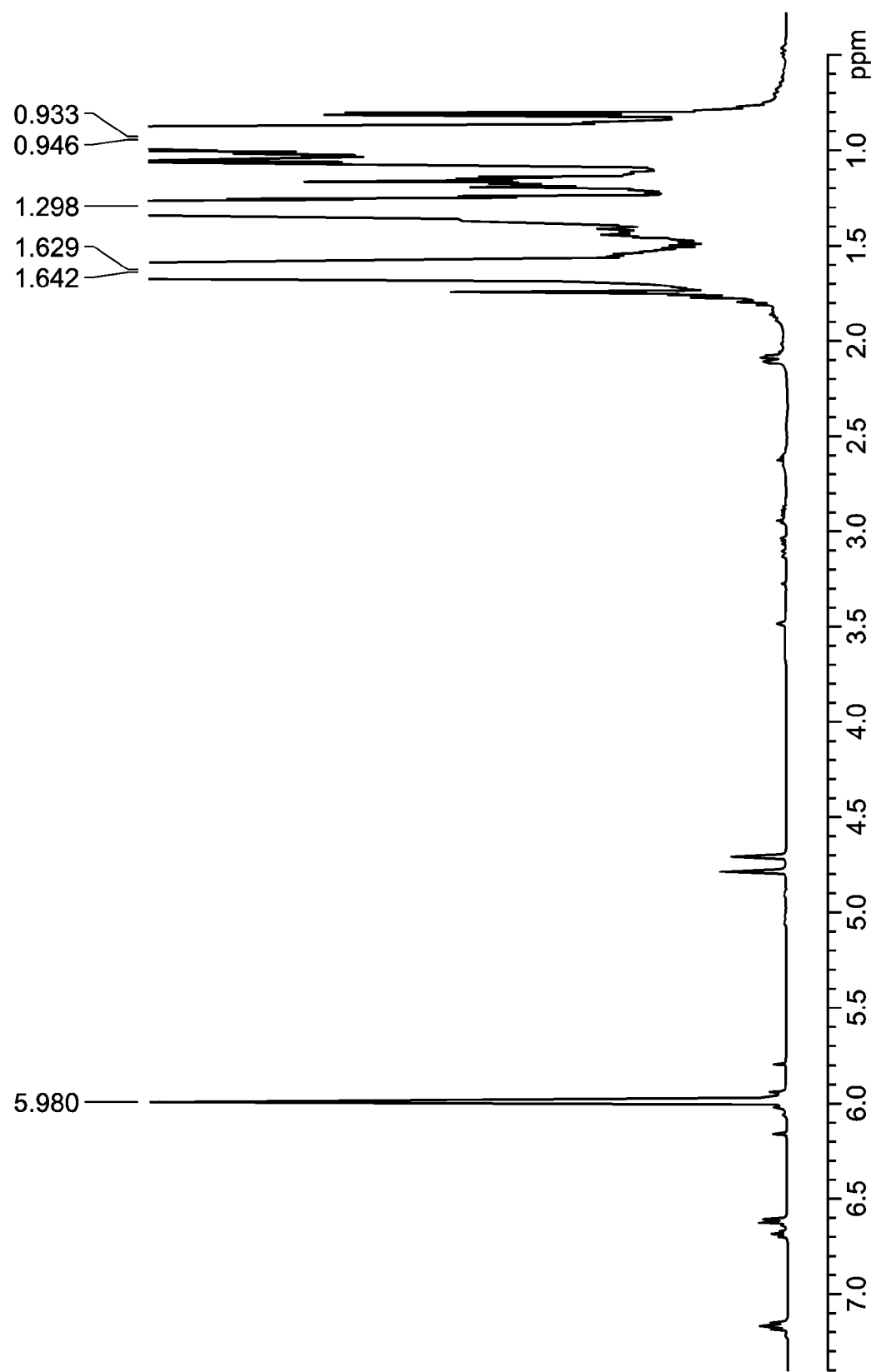
FIG. 4 is a 500 MHz $^1$H NMR spectrum (120° C. in $D_2$-tetrachloroethane) of the product formed by the Ta(NMe$_2$)$_5$ catalyzed reaction of vinyl-terminated iPP with N-methyl aniline (Example 4 from Table 1).
Figure 5:
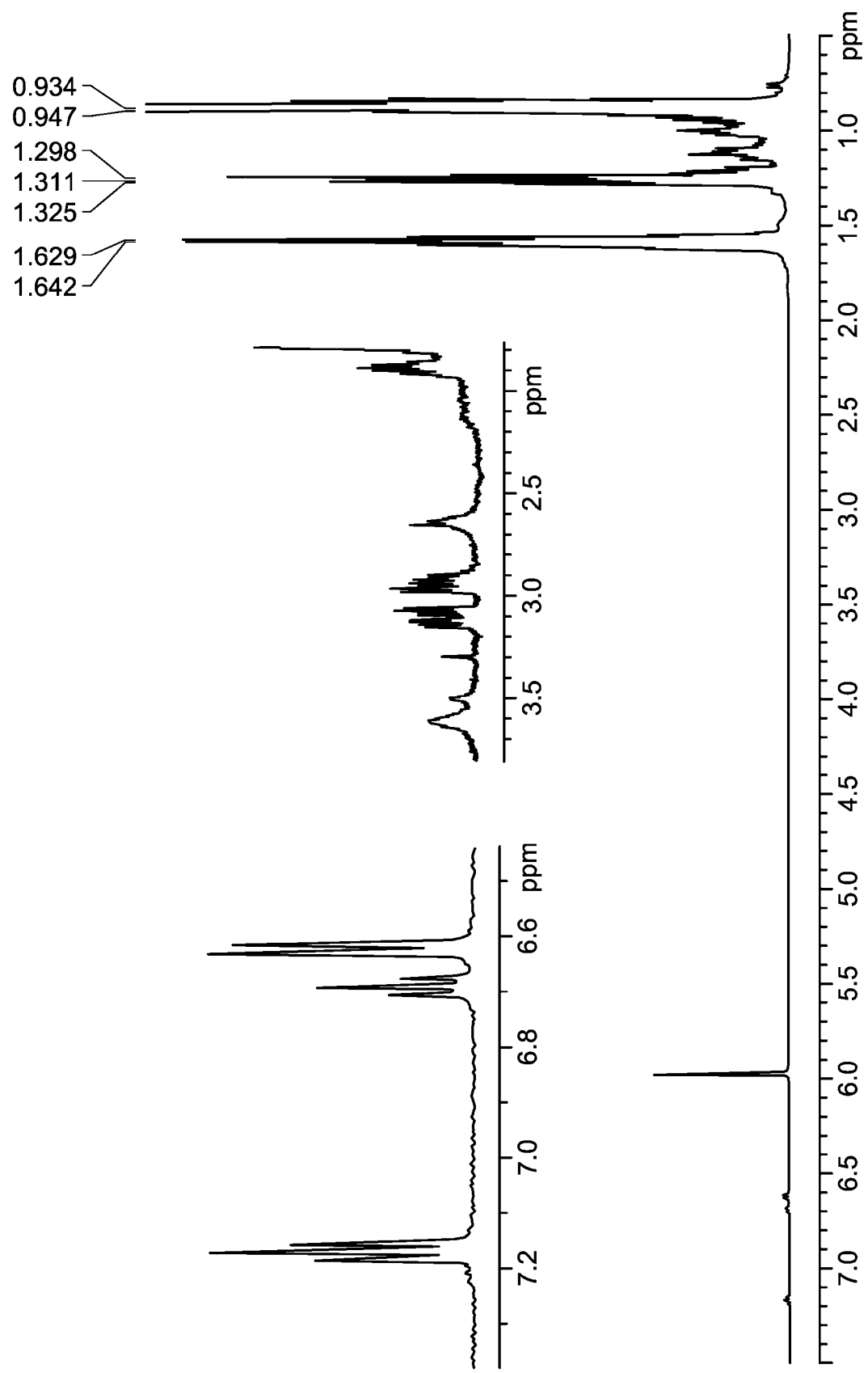
FIG. 5 is a 500 MHz $^1$H NMR spectrum (122° C. in $D_2$-tetrachloroethane) of the product formed by the Ta(NMe$_2$)$_5$ catalyzed reaction of vinyl-terminated iPP with N-methyl aniline (Example 5 from Table 1).
Figure 6:
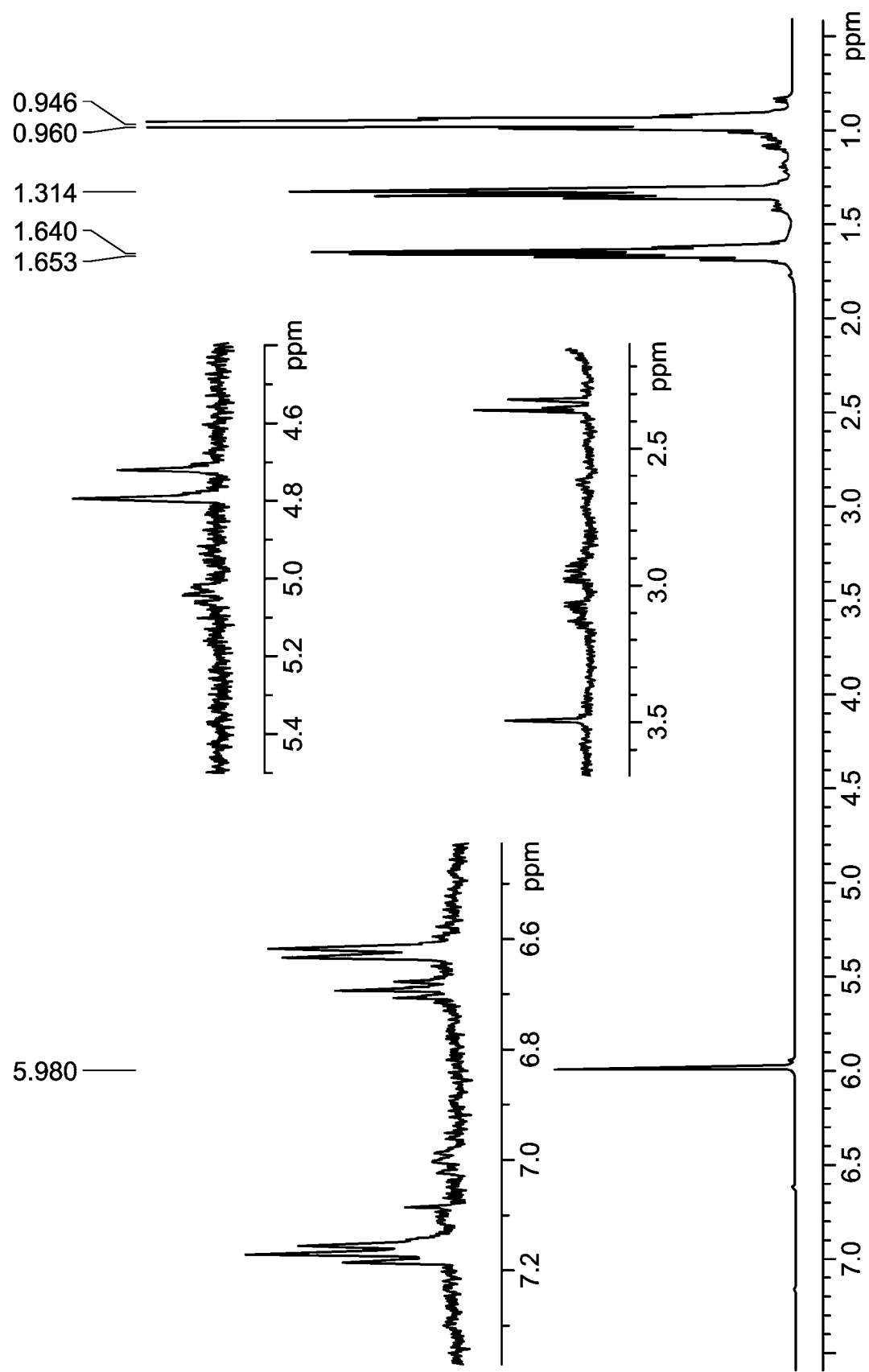
FIG. 6 is a 500 MHz $^1$H NMR spectrum (120° C. in $D_2$-tetrachloroethane) of the product formed by the Ta(NMe$_2$)$_5$ catalyzed reaction of vinyl-terminated iPP with N-methyl aniline (Example 6 from Table 1).
Figure 7:
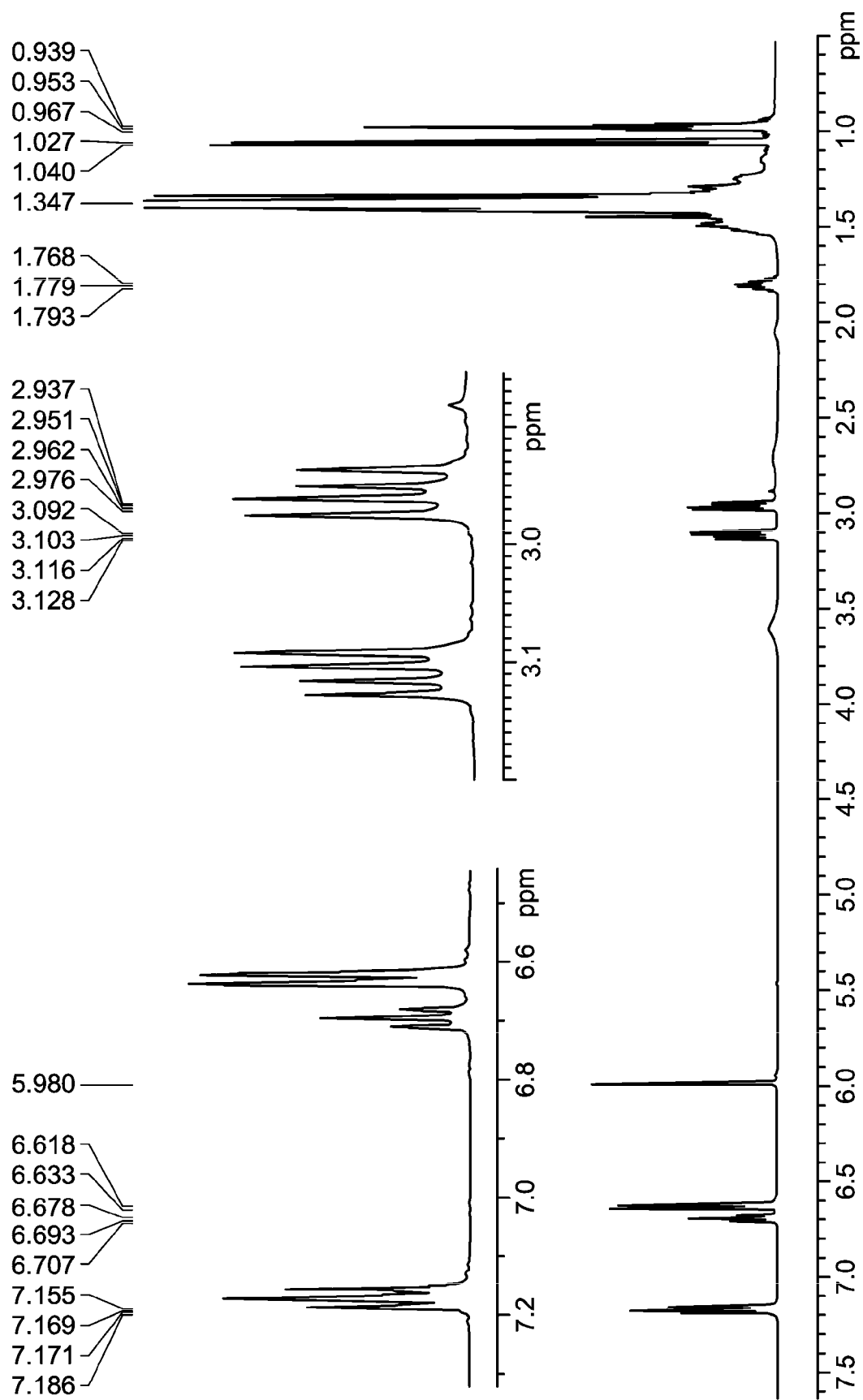
FIG. 7 is a 500 MHz $^1$H NMR spectrum (120° C. in $D_2$-tetrachloroethane) of the product formed by the Ta(NMe$_2$)$_5$ catalyzed reaction of vinyl-terminated PE with N-methyl aniline (Example 7 from Table 1).
Figure 8:
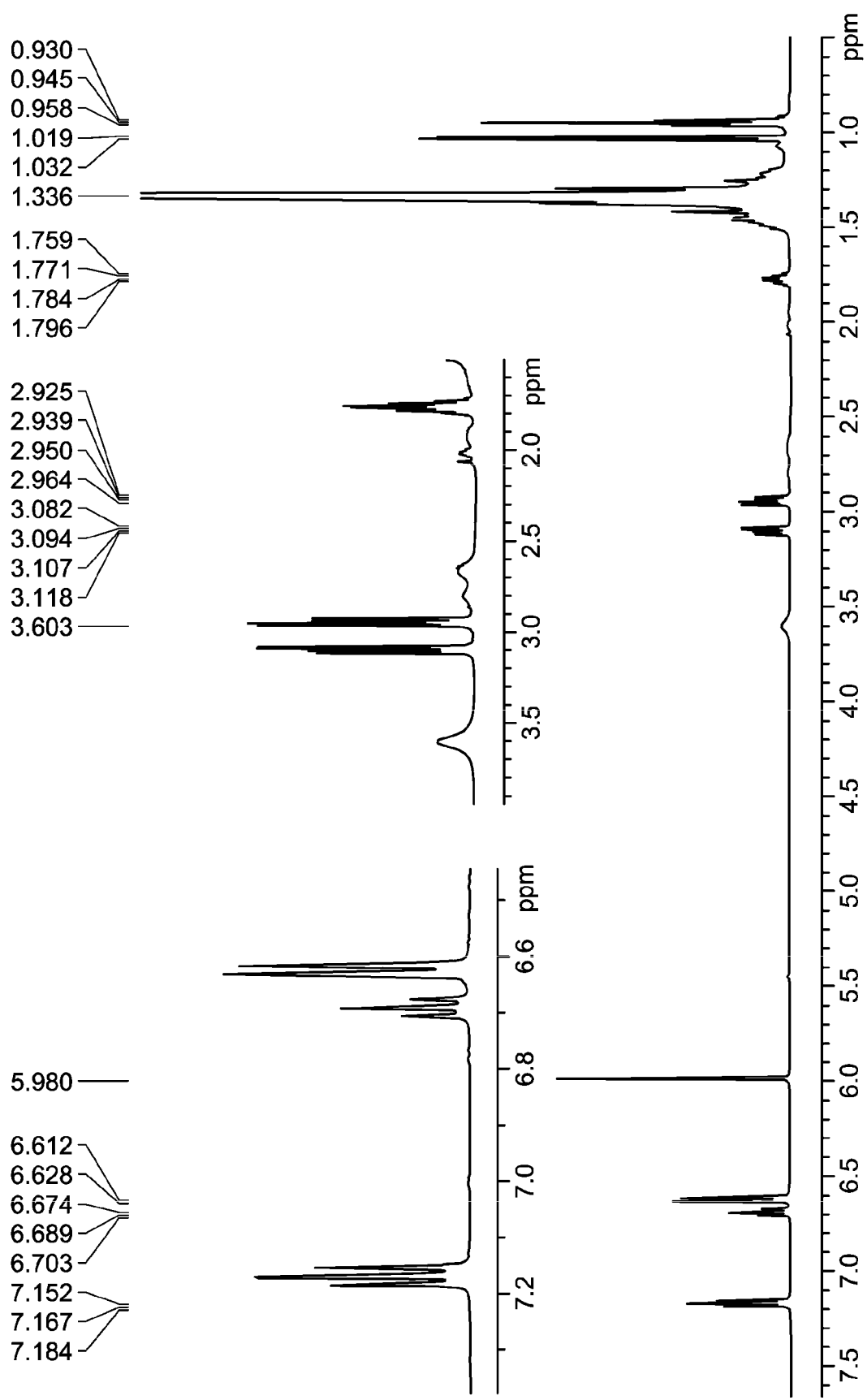
FIG. 8 is a 500 MHz $^1$H NMR spectrum (112° C. in $D_2$-tetrachloroethane) of the product formed by the Ta(NMe$_2$)$_5$ catalyzed reaction of vinyl-terminated PE with N-methyl aniline (Example 8 from Table 1).
Figure 9:
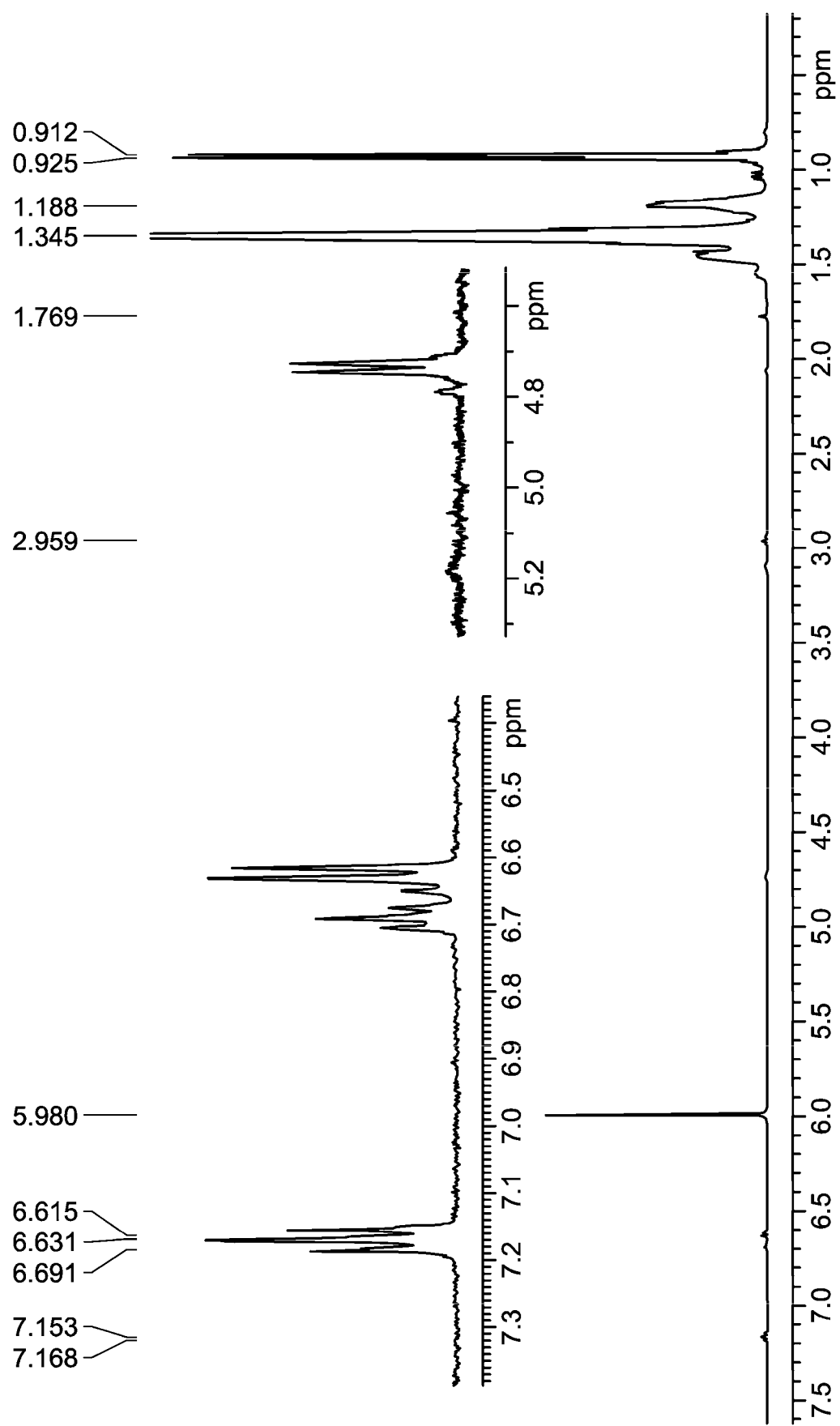
FIG. 9 is a 500 MHz $^1$H NMR spectrum (120° C. in $D_2$-tetrachloroethane) of the product formed by the Ta(NMe$_2$)$_5$ catalyzed reaction of vinyl-terminated EP copolymer with N-methyl aniline (Example 9 from Table 1).
Figure 10:
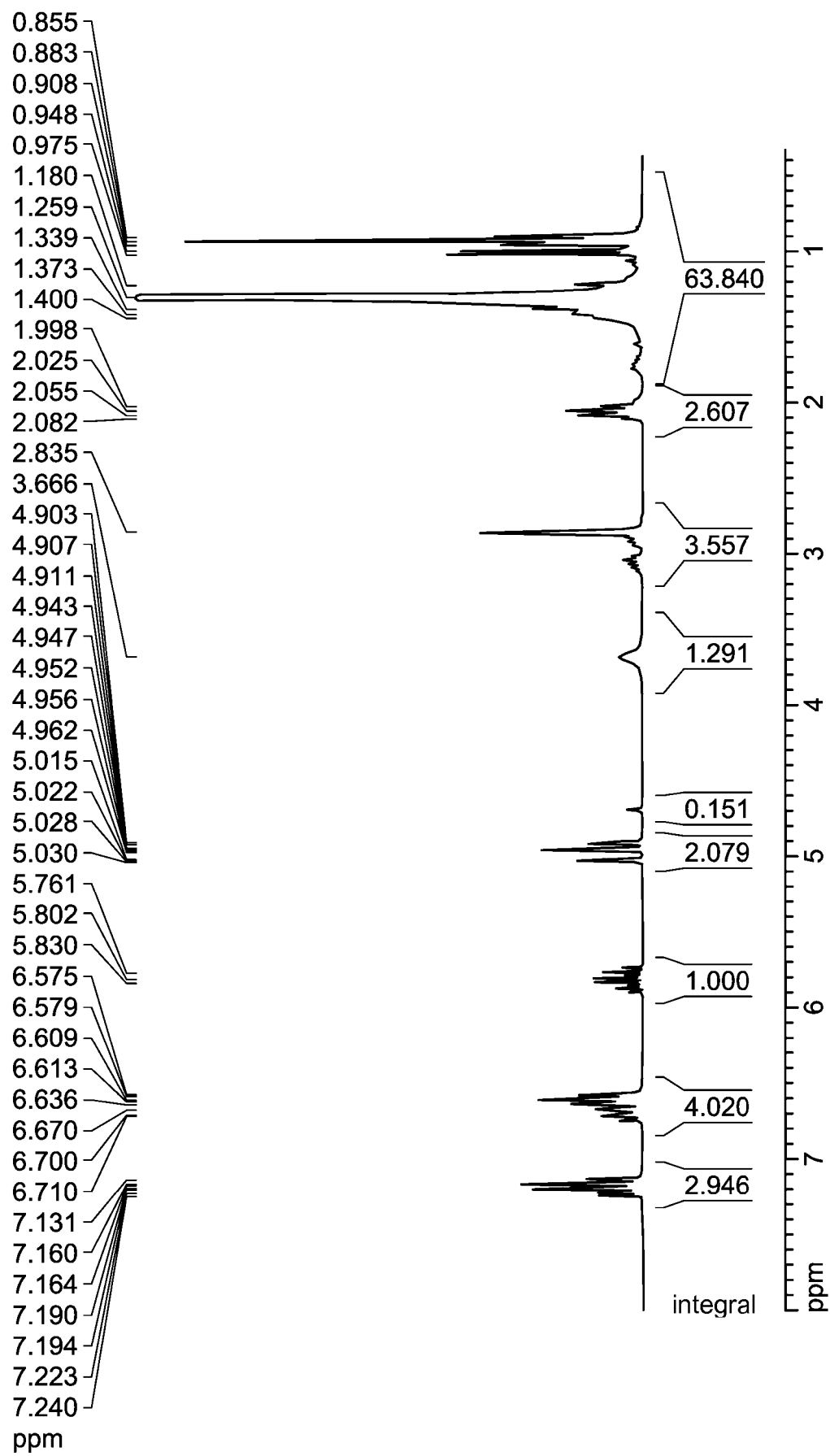
FIG. 10 is a 500 MHz $^1$H NMR spectrum (120° C. in $D_2$-tetrachloroethane) of the product formed by the Ta(NEt$_2$)$_2$Cl$_3$ catalyzed reaction of 1-octadecene with N-methyl aniline (Example 10 from Table 1).

The percentage of isobutyl end groups is determined using $^{13}$C NMR (as described in WO 2009/155471 at paragraph [0095] and [0096] except that the spectra are referenced to the chemical shift of the solvent, tetrachloroethane-d$_2$) and the chemical shift assignments in Resconi et al, J. Am. Chem. Soc. 1992, 114, pp. 1025-1032 for 100% propylene polymers (and polymers) and set forth in FIG. 2 for E-P polymers of WO 2009/155471. The "isobutyl chain end to allylic vinyl group ratio" is defined to be the ratio of the percentage of isobutyl chain ends to the percentage of allyl chain ends.

This invention can be practiced with any vinyl containing materials, preferably with vinyl terminated polymers, such as vinyl terminated ethylene homo- and copolymers, and vinyl terminated propylene homo- and copolymers. Many of these materials are known in the art and can be functionalized using the processes described herein, e.g., contacting a transition metal amide catalyst (as described herein) with an alkyl amine (as described herein) and one or more vinyl containing materials. Vinyl terminated polymers include homo- and copolymers of heteroatom containing monomers, as well as polymers of olefin monomers only. For purpose of this invention and the claims thereto, the term vinyl terminated polymers (also referred to as vinyl terminated polyolefins) includes vinyl terminated polymers and vinyl terminated copolymers. Preferred vinyl terminated polyolefins include vinyl terminated isotactic polypropylene (preferably having a melting point of 100° C. or more, preferably 150° C. or more), vinyl terminated polyethylene (preferably having a melting point of 100° C. or more, preferably 115° C. or more).

In a preferred embodiment, any vinyl terminated polyolefin described herein has at least 75% allyl chain ends (relative to total unsaturations), preferably at least 80%, preferably at least 85%, preferably at least 90%, preferably at least 95% allyl chain ends.

In a preferred embodiment, any vinyl terminated polyolefin described herein has an Mn of 200 g/mol or more, alternately from 200 to 60,000 g/mol, preferably from 200 to 50,000 g/mol, preferably from 200 to 40,000 g/mol, preferably from 500 to 30,000 g/mol, preferably from 1000 to 10,000 g/mol.

In a preferred embodiment, the vinyl terminated polyolefin used herein comprises at least 10 mol % (alternately at least 20 mol %, alternately at least 40 mol %, alternately at least 60 mol %) of a $C_4$ or greater olefin (such as butene, pentene, octene, nonene, decene, undecene, dodecene, preferably $C_5$ to $C_{40}$ alpha olefin, such as pentene, octene, nonene, decene, undecene, dodecene) and has: 1) at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%; and 2) an Mn of from 200 to 60,000 g/mol, preferably from 200 to 50,000 g/mol, preferably from 500 to 40,000 g/mol.

In a preferred embodiment the vinyl terminated polyolefin is a homopolymer or copolymer comprising one or more $C_2$ to $C_{40}$ olefins, preferably $C_2$ to $C_{40}$ alpha olefins, preferably ethylene, propylene, butene, pentene, hexene, octene, 1-nonene, 1-decene, 1-undecene, 1-dodecene, and/or 4-methylpentene-1. In a preferred embodiment, the vinyl terminated polyolefin used herein has an Mn of from 200 to 60,000 g/mol, preferably from 500 to 30,000 g/mol, preferably from 1,000 to 20,000 g/mol and is a homopolymer or copolymer comprising two or more $C_2$ to $C_{40}$ olefins, preferably two or more or $C_3$ to $C_{20}$ alpha olefins, preferably two or more of ethylene, propylene, butene, pentene, hexene, octene, nonene, decene, undecene, and/or dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%.

In a preferred embodiment, the vinyl terminated polyolefin is a polymer having an Mn of from 200 to 21,000 g/mol (preferably 500 to 15,000, preferably 800 to 20,000 g/mol) comprising one or more alpha olefins selected from the group consisting of $C_2$ to $C_{40}$ alpha olefins, preferably ethylene, propylene, butene, pentene, hexene, octene, nonene, decene, undecene, and dodecene. In a preferred embodiment, the vinyl terminated polyolefin is a polymer having an Mn of from 500 to 21,000 g/mol (preferably 700 to 21,000, preferably 800 to 20,000 g/mol) comprising two or more alpha olefins selected from the group consisting of $C_2$ to $C_{40}$ alpha olefins, preferably $C_3$ to $C_{20}$ alpha olefins, preferably two or more alpha olefins selected from the group consisting of ethylene, propylene, butene, pentene, hexene, octene, nonene, decene, undecene, and dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%.

Preferably the vinyl terminated polyolefin is an ethylene polymer, e.g., a homo-polymer of ethylene or copolymer of ethylene and up to 50 mol % (preferably from 0.5 to 25 mol %, preferably from 1 to 20 mol %) of one or more $C_3$ to $C_{40}$ alpha olefin comonomers, preferably selected from the group consisting of propylene, butene, pentene, hexene, octene, nonene, decene, undecene, and dodecene. Alternately, the vinyl terminated polyolefin is a propylene polymer, e.g., a homopolymer of propylene or copolymer of propylene and up to 50 mol % (preferably from 0.5 to 25 mol %, preferably from 1 to 20 mol %) of one or more $C_2$ and $C_4$ to $C_{40}$ alpha olefin comonomers, preferably selected from the group consisting of ethylene, butene, pentene, hexene, octene, nonene, decene, undecene, and dodecene. Alternately, the vinyl terminated polyolefin is a copolymer of ethylene and/or propylene and a $C_4$ to $C_{40}$ alpha-olefin, such as butene, pentene, hexene, octene, nonene, decene, undecene, and dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%. Alternately, the vinyl terminated polyolefin is a copolymer of ethylene and/or propylene and two or more $C_4$ to $C_{40}$ alpha olefins, such as butene, pentene, hexene, octene, nonene, decene, undecene, and dodecene. In a particularly preferred embodiment, the vinyl terminated polyolefin has at least 30% allyl chain ends, relative to total unsaturations (preferably at least 40%, preferably at least 50%, preferably at least 60%, preferably at least 70%, preferably at least 75%, preferably at least 80%, preferably at least 85%, preferably at least 90%, preferably at least 95%) and the vinyl terminated polyolefin is a copolymer of:
1) ethylene and two or more $C_4$ to $C_{40}$ alpha olefins, such as butene, pentene, hexene, octene, nonene, decene, undecene, dodecene; or
2) propylene and two or more $C_4$ to $C_{40}$ alpha olefins, such as butene, pentene, hexene, octene, nonene, decene, undecene, dodecene; or
3) ethylene and propylene and two or more $C_4$ to $C_{40}$ alpha olefins, such as butene, pentene, hexene, octene, nonene, decene, undecene, dodecene; or
4) propylene and two or more alpha olefins selected from butene, pentene, hexene, octene, nonene, decene, undecene, and dodecene.

In a preferred embodiment, the vinyl terminated polyolefin is a polymer having an Mn of greater than 1,000 g/mol (preferably from 2,000 to 60,000, preferably 5,000 to 50,000 g/mol) comprising one or more alpha olefins selected from the group consisting of $C_2$ to $C_{40}$ alpha olefins, preferably ethylene, propylene, butene, pentene, hexene, octene, nonene, decene, undecene, dodecene, and 4-methyl-pentene-1. Preferably the vinyl terminated polyolefin is an ethylene polymer, e.g., a homopolymer of ethylene or copolymer of ethylene and up to 50 mol % (preferably from 0.5 to 25 mol %, preferably from 1 to 20 mol %) of one or more $C_3$ to $C4_0$ alpha olefin comonomers, preferably selected from the group consisting of propylene, butene, pentene, hexene, octene, nonene, decene, undecene, dodecene, and 4-methyl-pentene-1. Alternately, the vinyl terminated polyolefin is propylene polymer, e.g., a homopolymer of propylene or a copolymer of propylene and up to 50 mol % (preferably from 0.5 to 25 mol %, preferably from 1 to 20 mol %) of one or more $C_2$ to $C_{40}$ alpha olefins comonomers, preferably selected from the group consisting of ethylene, butene, pentene, hexene, octene, nonene, decene, undecene, dodecene, and 4-methyl-pentene-1 having at least 30% allyl chain ends, relative to total unsaturations (preferably at least 40%, preferably at least 50%, preferably at least 60%, preferably at least 70%, preferably at least 75%, preferably at least 80%, preferably at least 85%, preferably at least 90%, preferably at least 95%).

In another embodiment, the vinyl terminated polyolefin useful herein may be one or more vinyl terminated polyolefins having an Mn (measured by $^1$H NMR) of 200 g/mol or more, (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 to about 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ olefin (preferably $C_5$ to $C_{30}$ α-olefins, more preferably $C_5$-$C_{20}$ α-olefins, preferably, $C_5$-$C_{12}$ α-olefins, preferably pentene, hexene, heptene, octene, nonene, decene, undecene, dodecene, norbornene, cyclopentene, cycloheptene, cyclooctene, cyclooctadiene, cyclododecene, 7-oxanorbornene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, norbornene, and their respective homologs and derivatives, preferably norbornene); and (ii) from about 0.1 to about 80 mol % of propylene (preferably from about 5 to about 70 mol %, from about 10 to about 65 mol %, from about 15 to about 55 mol %, from about 25 to about 50 mol %, or from about 30 to about 80 mol %); wherein the vinyl terminated polyolefins has at least 40% allyl chain ends, relative to total unsaturations (preferably at least 50%, at least 60%, at least 70%; at least 80%, at least 90%; at least 95%); and, optionally, an isobutyl chain end to allylic chain end ratio of less than 0.70:1 (preferably less than 0.65:1, less than 0.60:1, less than 0.50:1, or less than 0.25:1), and further optionally, an allyl chain end to vinylidene chain end (as determined by $^1$H NMR) ratio of more than 2:1 (preferably more than 2.5:1, more than 3:1, more than 5:1, or more than 10:1), and further optionally, an allyl chain end to vinylene chain end ratio of greater than 10:1 (preferably greater than 15:1, or greater than 20:1); and even further optionally preferably substantially no isobutyl chain ends (preferably less than 0.1 wt % isobutyl chain ends). For further information on such vinyl terminated polyolefins please see concurrently filed U.S. Ser. No. 13/072,249, filed Mar. 25, 2011, entitled "Vinyl Terminated Higher Olefin Copolymers and Methods to Produce Thereof."

In another embodiment, the vinyl terminated polyolefins useful herein may be one or more vinyl terminated polyolefins having an Mn (measured by $^1$H NMR) of 200 g/mol or more (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol) and comprises: (i) from about 80 to about 99.9 mol % (preferably about 85 to about 99.9 mol %, more preferably about 90 to about 99.9 mol %) of at least one $C_4$ olefin (preferably 1-butene); and (ii) from about 0.1 to 20 mol % of propylene, preferably 0.1 to 15 mol %, more preferably 0.1 to 10 mol %; wherein the VTM has at least 40% allyl chain ends relative to total unsaturations, preferably at least 50%, at least 60%, at least 70%; or at least 80%; and, optionally, an isobutyl chain end to allylic chain end ratio of less than 0.70:1, less than 0.65:1, less than 0.60:1, less than 0.50:1, or less than 0.25:1, and further optionally, an allyl chain end to vinylidene chain end ratio of more than 2:1, more than 2.5:1, more than 3:1, more than 5:1, or more than 10:1, and further optionally, an allyl chain end to vinylene chain end ratio of greater than 10:1 (preferably greater than 15:1, or greater than 20:1); and even further optionally preferably substantially no isobutyl chain ends (preferably less than 0.1 wt % isobutyl chain ends). For further information on such VTM's please see concurrently filed U.S. Ser. No. 13/072,249, filed Mar. 25, 2011, entitled "Vinyl Terminated Higher Olefin Copolymers and Methods to Produce Thereof."

In particular embodiments herein, the invention relates to a composition comprising vinyl terminated polyolefins polymers having an Mn of at least 200 g/mol, (preferably 200 to 100,000 g/mol, preferably 200 to 75,000 g/mol, preferably 200 to 60,000 g/mol, preferably 300 to 60,000 g/mol, or preferably 750 to 30,000 g/mol) (measured by $^1$H NMR) comprising of one or more (preferably two or more, three or more, four or more, and the like) $C_4$ to $C_{40}$ (preferably $C_4$ to $C_{30}$, $C_4$ to $C_{20}$, or $C_4$ to $C_{12}$, preferably butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof) higher olefin derived units, where the vinyl terminated higher olefin polymer comprises substantially no propylene derived units (preferably less than 0.1 wt % propylene); and wherein the higher olefin polymer has at least 5% (at least 10%, at least 15%, at least 20%, at least 30%, at least 40%, at least 50%, at least 60%, at least 70%; at least 80%, at least 90%, or at least 95%) allyl chain ends, relative to total unsaturations; and optionally, an allyl chain end to vinylidene chain end ratio of greater than 2:1 (preferably greater than 2.5:1, greater than 3:1, greater than 5:1, or greater than 10:1); and further optionally, an allyl chain end to vinylene chain end ratio of greater than 10:1 (preferably greater than 15:1, or greater than 20:1); and even further optionally preferably substantially no isobutyl chain ends (preferably less than 0.1 wt % isobutyl chain ends). In some embodiments, these higher olefin vinyl terminated polymers may comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene). For further information on such vinyl terminated polyolefins please see concurrently filed U.S. Ser. No. 13/072,288, filed Mar. 25, 2011, entitled "Vinyl Terminated Higher Olefin Polymers and Methods to Produce Thereof."

In another embodiment, the vinyl terminated polyolefin useful herein is a branched polyolefin having an Mn of 7,500 to 60,000 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), said branched polyolefin having: (i) 50 mol % or greater allyl chain ends, relative to total unsaturated chain ends (preferably 60% or more, preferably 70% or more, preferably 75% or more, preferably 80% or more, preferably 90% or more, preferably 95% or more); (ii) a g'(vis) of 0.90 or less (preferably 0.85 or less, preferably 0.80 or less); (iii), optionally, an allyl chain end to internal vinylidene ratio of greater than 5:1 (preferably greater than 10:1); and (iv) optionally, an allyl chain end to vinylidene chain end ratio of greater than 10:1 (preferably greater than 15:1).

In another embodiment, the vinyl terminated polyolefin useful herein is a branched polyolefin having an Mn of 60,000 g/mol or more (and optionally a Tm of greater than 60° C. (preferably greater than 100° C.); and/or, optionally, a ΔHf of greater than 7 J/g (preferably greater than 50 J/g)) comprising one or more alpha olefins (preferably ethylene and/or propylene and optionally a $C_4$ to $C_{10}$ alpha olefin); and having: (i) 50 mol % or greater allyl chain ends, relative to total unsaturated chain ends (preferably 60% or more, preferably 70% or more, preferably 75% or more, preferably 80% or more, preferably 90% or more, preferably 95% or more); (ii) a g'(vis) of 0.90 or less (preferably 0.85 or less, preferably 0.80 or less); (iii) a bromine number which, upon complete hydrogenation, decreases by at least 50% (preferably at least 75%); (iv), optionally, an allyl chain end to internal vinylidene ratio of greater than 5:1 (preferably greater than 10:1); and (v) optionally, an allyl chain end to vinylidene chain end ratio of greater than 10:1, preferably greater than 15:1).

In another embodiment, the vinyl terminated polyolefin useful herein is a branched polyolefin having an Mn of less than 7,500 g/mol, preferably from 100 to 7,000 g/mol, preferably from 400 to 6,500 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), and having: (i) 50 mol % or greater allyl chain ends, relative to total unsaturated chain ends (preferably 60% or more, preferably 70% or more, preferably 80% or more, preferably 90% or more, preferably 95% or more); (ii) a ratio of percentage of saturated chain ends to percentage of allyl chain ends of 1.2 to 2.0 (preferably a ratio of percentage of saturated chain ends (preferably isobutyl chain ends) to percentage of allyl chain ends of 1.6 to 1.8, wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$, and/or a ratio of Mn(GPC)/Mn($^1$H NMR) of 0.95 or less (preferably 0.90 or less, preferably 0.85 or less, preferably 0.80 or less); (iii) optionally, a bromine number which, upon complete hydrogenation, decreases by at least 50% (preferably by at least 75%); (iv) optionally, an allyl chain end to internal vinylidene ratio of greater than 5:1 (preferably greater than 10:1); and (v) optionally, an allyl chain end to vinylidene chain end ratio of greater than 2:1 (preferably greater than 10:1), preferably the branched vinyl terminated polyolefin has a ratio of Mn(GPC)/

Mn($^1$H NMR) of 0.95 or less (preferably 0.90 or less, preferably 0.85 or less, preferably 0.80 or less).

C$_4$ to C$_{10}$ alpha olefin monomers useful in the branched polymers described above include butene, pentene, hexene, heptene, octene, nonene, decene, cyclopentene, cycloheptene, cyclooctene, and isomers thereof.

For more information on useful branched polymers and methods to produce them, please see concurrently filed U.S. Ser. No. 61/467,681, filed Mar. 25, 2011, entitled "Branched Vinyl Terminated Polymers and Methods for Production Thereof".

In another embodiment, the vinyl terminated polyolefin consist essentially of propylene, functional group and optionally ethylene.

Alternately C$_4$ olefins (such as isobutylene, butadiene, n-butene) are substantially absent from the vinyl terminated polyolefin. Alternately C$_{4-20}$ olefins are substantially absent from the vinyl terminated polyolefin. Alternately isobutylene is substantially absent from the vinyl terminated polyolefin. By substantially absent is meant that the monomer is present in the polyolefin at 1 wt % or less, preferably at 0.5 wt % or less, preferably at 0 wt %.

In another embodiment, the vinyl terminated polyolefin has a branching index, g'$_{vis}$ (as determined by GPC), of 0.98 or less, alternately 0.96 or less, alternately 0.95 or less, alternately 0.93 or less, alternately 0.90 or less, alternately 0.85 or less, alternately 0.80 or less, alternately 0.75 or less, alternately 0.70 or less, alternately 0.65 or less, alternately 0.60 or less, alternately 0.55 or less, relative to a linear polymer of the same composition and microstructure.

In another embodiment, the vinyl terminated polyolefin preferably has a glass transition temperature (Tg) of less than 0° C. or less (as determined by differential scanning calorimetry as described below), preferably −10° C. or less, more preferably −20° C. or less, more preferably −30° C. or less, more preferably −50° C. or less.

In another embodiment, the vinyl terminated polyolefin has a melting point (DSC first melt) of from 30 to 200° C., alternately 40 to 180° C., alternately 50 to 100° C. In another embodiment, the polymers described herein have no detectable melting point by DSC following storage at ambient temperature (23° C.) for at least 48 hours.

In another embodiment, the vinyl terminated polyolefins described herein are a liquid at 25° C.

In a particularly preferred embodiment, the vinyl terminated polyolefin comprises one or more of:
a) a propylene copolymer having an Mn of 300 to 30,000 g/mol (as measured by $^1$H NMR) comprising 10 to 90 mol % propylene and 10 to 90 mol % of ethylene, wherein the polymer has at least X % allyl chain ends (relative to total unsaturations), where: 1) X=(−0.94 (mol % ethylene incorporated)+100), when 10 to 60 mol % ethylene is present in the copolymer, and 2) X=45, when greater than 60 and less than 70 mol % ethylene is present in the copolymer, and 3) X=(1.83*(mol % ethylene incorporated)−83), when 70 to 90 mol % ethylene is present in the copolymer; and/or
b) a propylene polymer, comprising more than 90 mol % propylene and less than 10 mol % ethylene, wherein the polymer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum; and/or
c) a propylene polymer, comprising at least 50 mol % propylene and from 10 to 50 mol % ethylene, wherein the polymer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %; and/or
d) a propylene polymer, comprising at least 50 mol % propylene, from 0.1 to 45 mol % ethylene, and from 0.1 to 5 mol % C$_4$ to C$_{12}$ olefin, wherein the polymer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0; and/or
e) a propylene polymer, comprising at least 50 mol % propylene, from 0.1 to 45 mol % ethylene, and from 0.1 to 5 mol % diene, wherein the polymer has: at least 90% allyl chain ends, an Mn of about 150 to about 10,000 g/mol (as measured by $^1$H NMR), and an isobutyl chain end to allylic vinyl group ratio of 0.7:1 to 1.35:1.0; and/or
f) a homopolymer, comprising propylene, wherein the polymer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

In a preferred embodiment, vinyl terminated polyolefins useful in this invention include propylene polymers, comprising propylene and less than 0.5 wt % comonomer, preferably 0 wt % comonomer, wherein the polymer has:
i) at least 93% allyl chain ends (preferably at least 95%, preferably at least 97%, preferably at least 98%);
ii) a number average molecular weight (Mn) of about 500 to about 20,000 g/mol, as measured by $^1$H NMR (preferably 500 to 15,000, preferably 700 to 10,000, preferably 800 to 8,000 g/mol, preferably 900 to 7,000, preferably 1000 to 6,000, preferably 1000 to 5,000);
iii) an isobutyl chain end to allylic vinyl group ratio of 0.8:1 to 1.3:1.0; and
iv) less than 1400 ppm aluminum, (preferably less than 1200 ppm, preferably less than 1000 ppm, preferably less than 500 ppm, preferably less than 100 ppm).

Vinyl terminated olefin polymers useful in this invention also include propylene copolymers having an Mn of 300 to 30,000 g/mol as measured by $^1$H NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the polymer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50 (−0.94 (mol % ethylene incorporated)+100)}), when 10 to 60 mol % ethylene is present in the copolymer, and 2) X=45 (alternately 50, alternately 60), when greater than 60 and less than 70 mol % ethylene is present in the copolymer, and 3) X=(1.83*(mol % ethylene incorporated)−83, {alternately 1.20 [1.83*(mol % ethylene incorporated)-83], alternately 1.50 [1.83*(mol % ethylene incorporated)-83]}), when 70 to 90 mol % ethylene is present in the copolymer. Alternately X is 80% or more, preferably 85% or more, preferably 90% or more, preferably 95% or more. In an alternate embodiment the polymer has at least 80% isobutyl chain ends (based upon the sum of isobutyl and n-propyl saturated chain ends), preferably at least 85% isobutyl chain ends, preferably at least 90% isobutyl chain ends. Alternately, the polymer has an isobutyl chain end to allylic vinyl group ratio of 0.8:1 to 1.35:1.0, preferably 0.9:1 to 1.20:1.0, preferably 0.9:1.0 to 1.1:1.0.

Vinyl terminated olefin polymers useful in this invention also include propylene polymers, comprising more than 90 mol % propylene (preferably 95 to 99 mol %, preferably 98 to 99 mol %) and less than 10 mol % ethylene (preferably 1 to 4 mol %, preferably 1 to 2 mol %), wherein the polymer has:
   i) at least 93% allyl chain ends (preferably at least 95%, preferably at least 97%, preferably at least 98%);
   ii) a number average molecular weight (Mn) of about 400 to about 30,000 g/mol, as measured by $^1$H NMR (preferably 500 to 20,000, preferably 600 to 15,000, preferably 700 to 10,000 g/mol, preferably 800 to 9,000, preferably 900 to 8,000, preferably 1000 to 6,000);
   iii) an isobutyl chain end to allylic vinyl group ratio of 0.8:1 to 1.35:1.0, and
   iv) less than 1400 ppm aluminum, (preferably less than 1200 ppm, preferably less than 1000 ppm, preferably less than 500 ppm, preferably less than 100 ppm).

Vinyl terminated olefin polymers useful in this invention also include propylene polymers, comprising: at least 50 (preferably 60 to 90, preferably 70 to 90) mol % propylene and from 10 to 50 (preferably 10 to 40, preferably 10 to 30) mol % ethylene, wherein the polymer has:
   i) at least 90% allyl chain ends (preferably at least 91%, preferably at least 93%, preferably at least 95%, preferably at least 98%);
   ii) an Mn of about 150 to about 20,000 g/mol, as measured by $^1$H NMR (preferably 200 to 15,000, preferably 250 to 15,000, preferably 300 to 10,000, preferably 400 to 9,500, preferably 500 to 9,000, preferably 750 to 9,000); and
   iii) an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

Vinyl terminated olefin polymers useful in this invention also include propylene polymers, comprising:
at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the polymer has:
   i) at least 90% allyl chain ends (preferably at least 91%, preferably at least 93%, preferably at least 95%, preferably at least 98%);
   ii) a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and
   iii) an isobutyl chain end to allylic vinyl group ratio of 0.8:1 to 1.35:1.0.

Vinyl terminated olefin polymers useful in this invention also include propylene polymers, comprising:
at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has:
   i) at least 90% allyl chain ends (preferably at least 91%, preferably at least 93%, preferably at least 95%, preferably at least 98%);
   ii) a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and
   iii) an isobutyl chain end to allylic vinyl group ratio of 0.7:1 to 1.35:1.0.

Any of the vinyl terminated polyolefins described herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum. ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644, is used to determine the amount of an element in a material.

In a preferred embodiment, the vinyl terminated polyolefin (preferably a propylene polymer) comprises less than 3 wt % of functional groups selected from hydroxide, aryls and substituted aryls, halogens, alkoxys, carboxylates, esters, acrylates, oxygen, and carboxyl, preferably less than 2 wt %, more preferably less than 1 wt %, more preferably less than 0.5 wt %, more preferably less than 0.1 wt %, more preferably 0 wt %, based upon the weight of the vinyl terminated polyolefin.

Preferably, the vinyl terminated polyolefin is a polymer having an $M_n$ as determined by $^1$H NMR of 150 to 25,000 g/mole, 200 to 20,000 g/mol, preferably 250 to 15,000 g/mol, preferably 300 to 15,000 g/mol, preferably 400 to 12,000 g/mol, preferably 750 to 10,000 g/mol. Further a desirable molecular weight range can be any combination of any upper molecular weight limit with any lower molecular weight limit described above.

In some embodiments, the vinyl terminated polyolefin contains less than 80 wt % of $C_4$ olefin(s), (such as isobutylene n-butene, 2-butene, isobutylene, and butadiene), based upon the weight of the vinyl terminated polyolefin, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the vinyl terminated polyolefin.

Alternately, in some embodiments the vinyl terminated polyolefin contains less than 20 wt % of $C_4$ or more olefin(s), (such as $C_4$ to $C_{30}$ olefins, typically such as $C_4$ to $C_{12}$ olefins, typically such as $C_4$, $C_6$, $C_8$, $C_{12}$, olefins, etc.), based upon the weight of the vinyl terminated polyolefin, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the vinyl terminated polyolefin, as determined by $^{13}$C NMR.

In another embodiment, the vinyl terminated polymers described herein have a viscosity at 60° C. of greater than 1000 cP, greater than 12,000 cP, or greater than 100,000 cP. In other embodiments, the vinyl terminated polymers have a viscosity of less than 200,000 cP, less than 150,000 cP, or less than 100,000 cP. Viscosity is measured using a Brookfield Digital Viscometer.

In another embodiment, any vinyl terminated polyolefin composition described herein comprises less than 20 wt % dimer and trimer (preferably less than 10 wt %, preferably less than 5 wt %, more preferably less than 2 wt %, based upon the weight of the vinyl terminated polyolefin composition), as measured by Gas Chromatography. Products are analyzed by gas chromatography (Agilent 6890N with auto-injector) using helium as a carrier gas at 38 cm/sec. A column having a length of 60 m (J & W Scientific DB-1, 60 m×0.25 mm I.D.×1.0 µm film thickness) packed with a flame ionization detector (FID), an Injector temperature of 250° C., and a Detector temperature of 250° C. are used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, any vinyl terminated polyolefin described herein contains less than 25 ppm hafnium, preferably less than 10 ppm hafnium, preferably less than 5 ppm hafnium based on the yield of polymer produced and the mass of catalyst employed.

In another embodiment, any vinyl terminated polyolefins described herein may have a melting point (DSC first melt) of from 60 to 165° C., alternately 50 to 120° C. In another embodiment, the vinyl terminated polyolefins described herein have no detectable melting point by DSC following storage at ambient temperature (23° C.) for at least 48 hours.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

Particularly useful vinyl terminated polyolefins may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, the vinyl terminated polyolefin (preferably polypropylene) has at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In another embodiment, the vinyl terminated polyolefin (preferably polypropylene) has at least 85% syndiotacticity.

In another embodiment, the vinyl terminated polymers described herein have an Mw (measured as described below) of 1,000 to about 60,000 g/mol, alternately 2,000 to 25,000 g/mol, alternately 3,000 to 20,000 g/mol and/or an Mz of about 1,700 to about 150,000 g/mol, alternately 800 to 100,000 g/mol.

Mw, Mn, Mz, number of carbon atoms, and $g'_{vis}$ are determined by Gel Permeation Chromatography (GPC) using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B LS columns are used. The nominal flow rate is 0.5 cm$^3$/min and the nominal injection volume is 300 µL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{k M_v^\alpha}$$

where, for purpose of this invention and claims thereto, $\alpha$=0.695 and k=0.000579 for linear ethylene polymers, $\alpha$=0.705 k=0.000262 for linear propylene polymers, and $\alpha$=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for further guidance on selecting a linear standard having similar molecular weight and comonomer content and determining k coefficients and $\alpha$ exponents.

In another embodiment, any of the vinyl terminated polyolefins described or useful herein have 3-alkyl vinyl end groups (where the alkyl is a C1 to C38 alkyl), also referred to as a "3-alkyl chain ends" or a "3-alkyl vinyl termination", represented by the formula:

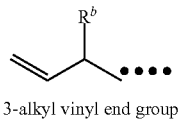

3-alkyl vinyl end group where "••••" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}$C NMR as set out below.

In a preferred embodiment, any of the vinyl terminated polyolefins described or useful herein have at least 5% 3-alkyl chain ends (preferably at least 10% 3-alkyl chain ends, at least 20% 3-alkyl chain ends, at least 30% 3-alkyl chain ends; at least 40% 3-alkyl chain ends, at least 50% 3-alkyl chain ends, at least 60% 3-alkyl chain ends, at least 70% 3-alkyl chain ends; at least 80% 3-alkyl chain ends, at least 90% 3-alkyl chain ends; at least 95% 3-alkyl chain ends, relative to total unsaturation.

In a preferred embodiment, any of the vinyl terminated polyolefins described or useful herein have at least 5% of 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80% 3-alkyl+allyl chain ends, at least 90% 3-alkyl+allyl chain ends; at least 95% 3-alkyl+allyl chain ends, relative to total unsaturation.

For more information on useful vinyl terminated polyolefins useful herein please see U.S. Ser. No. 12/143,663, filed Jun. 20, 2008, and concurrently filed U.S. Ser. No. 13/072,288, filed Mar. 25, 2011, entitled "Vinyl Terminated Higher Olefin Polymers and Methods to Produce Thereof", and concurrently filed U.S. Ser. No. 13/072,249, filed Mar. 25, 2011, entitled "Vinyl Terminated Higher Olefin Copolymers and Methods to Produce Thereof", and concurrently filed U.S. Ser. No. 61/467,681, filed Mar. 25, 2011, entitled "Branched Vinyl Terminated Polymers and Methods for Production Thereof".

Process to Make Vinyl Terminated Polyolefins

The vinyl terminated polyolefins described above are typically prepared in a homogeneous process, preferably a bulk process, as described in WO 2009/155471, which is incorporated by reference herein. Vinyl terminated polyolefins may also be produced using the processes (and catalyst compounds and/or activators) disclosed in concurrently filed U.S. Ser. No. 13/072,280, filed Mar. 25, 2011, entitled "Novel Catalysts and Methods of Use Thereof to Produce Vinyl Terminated Polymers" and U.S. Ser. No. 13/072,279, filed Mar. 25, 2011, entitled "Enhanced Catalyst Performance for Production of Vinyl Terminated Propylene and Ethylene/Propylene Macromers". Useful vinyl terminated polyolefins can also be produced using the processes disclosed in concurrently filed U.S. Ser. No. 13,072,288, filed Mar. 25, 2011, entitled "Vinyl Terminated Higher Olefin Polymers and Methods to Produce Thereof", and concurrently filed U.S. Ser. No. 13/072,249, filed Mar. 25, 2011, entitled "Vinyl Terminated Higher Olefin Copolymers and Methods to Produce Thereof", and concurrently filed U.S. Ser. No. 61/467,681, filed Mar. 25, 2011, entitled "Branched Vinyl Terminated Polymers and Methods for Production Thereof".

In a preferred embodiment, one, two or three or more $C_2$ to $C_{40}$ alpha olefins, such as ethylene, propylene, butene, pentene, hexene, octene, decene and dodecene (preferably ethylene and/or propylene and optional comonomers (such as one, two or three or more of ethylene, butene, hexene, octene, decene and dodecene) can be polymerized/polymerized by reacting a catalyst system (comprising metallocene compound(s), and one or more activators) with the olefins. Other additives may also be used, as desired, such as scavengers and/or hydrogen. Any conventional suspension, homogeneous bulk, solution, slurry, or high-pressure polymerization process can be used. Such processes can be run in a batch, semi-batch, or continuous mode. Such processes and modes are well known in the art. Homogeneous polymerization processes are preferred. A bulk homogeneous process is particularly preferred. Alternately no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof such as can be found commercially (Isopars); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable. In a preferred embodiment, aliphatic hydrocarbon solvents are used as the solvent, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably at 0 wt % based upon the weight of the solvents.

In a preferred embodiment, the feed concentration for the polymerization is 60 volume % solvent or less, preferably 40 volume % or less, preferably 20 volume % or less. Preferably the polymerization is run in a bulk process.

Suitable additives to the polymerization process can include one or more scavengers, promoters, modifiers, reducing agents, oxidizing agents, hydrogen, aluminum alkyls, or silanes.

In a preferred embodiment, little or no scavenger is used in the process to produce the vinyl terminated polyolefin. Preferably, scavenger is present at zero mol %, alternately the scavenger is present at a molar ratio of scavenger metal to transition metal of less than 100:1, preferably less than 50:1, preferably less than 15:1, preferably less than 10:1.

In a preferred embodiment, hydrogen is present in the polymerization reactor at a partial pressure of 0.001 to 50 psig (0.007 to 345 kPa), preferably from 0.01 to 25 psig (0.07 to 172.4 kPa), more preferably 0.1 to 10 psig (0.7 to 68.95 kPa). It has been found that in the present systems, hydrogen can be used to provide increased activity without significantly impairing the catalyst's ability to produce allylic chain ends. Preferably the catalyst activity (calculated as g/mmolcatalyst/hr) is at least 20% higher than the same reaction without hydrogen present, preferably at least 50% higher, preferably at least 100% higher.

In an alternate embodiment, the productivity is at least 4500 g/mmol/hour, preferably 5000 or more g/mmol/hour, preferably 10,000 or more g/mmol/hr, preferably 50,000 or more g/mmol/hr. In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr. In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

Preferred polymerizations can be run at typical temperatures and/or pressures, such as from 25 to 150° C., preferably 40 to 120° C., preferably 45 to 80° C., and preferably from 0.35 to 10 MPa, preferably from 0.45 to 6 MPa, preferably from 0.5 to 4 MPa.

In a typical polymerization, the residence time of the reaction is up to 60 minutes, preferably between 5 to 50 minutes, preferably 10 to 40 minutes.

In a preferred embodiment, little or no alumoxane is used in the process to produce the vinyl terminated polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polymers then, the alumoxane has been treated to remove free alkyl aluminum compounds, particularly trimethyl aluminum.

Further, in a preferred embodiment, the activator used herein to produce the vinyl terminated polymer is a bulky activator as defined herein and is preferably discrete.

In a preferred embodiment, little or no scavenger is used in the process to produce the vinyl terminated polymers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization to produce the vinyl terminated polyolefins: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably less than 0.5 wt %, preferably less than 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mole %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example $C_4$ raffinate streams, and can therefore be substantially less expensive than pure 1-butene.

Catalyst Compounds to Make Vinyl Terminated Polyolefins

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties. This includes other π-bound moieties such as indenyls or fluorenyls or derivatives thereof.

Catalyst systems comprising at least one catalyst, at least one activator, an optional co-activator, and an optional support material is useful to produce the vinyl terminated polyolefins useful herein.

Catalyst compounds useful herein to produce the vinyl terminated polyolefins include one or more metallocene compound(s) represented by the formulae:

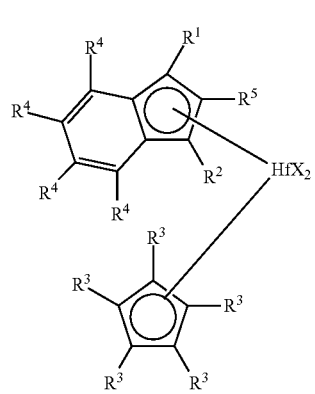

I

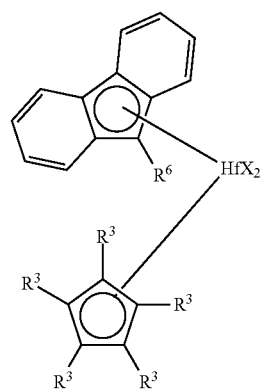

II

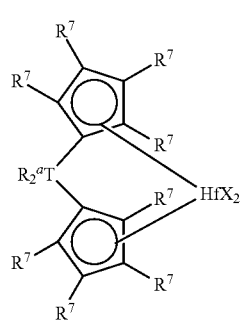

III

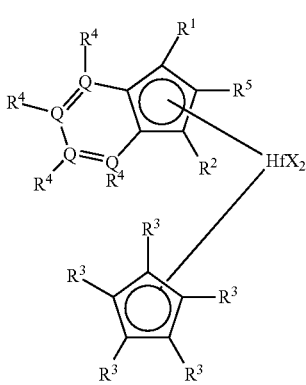

IV where:

Hf is hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each Q is, independently, carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);

each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, $R^1$ may the same or different as $R^2$;

each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, provided that at least one of $R^1$ or $R^2$ is not hydrogen, preferably both of $R^1$ and $R^2$ are not hydrogen, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen);

{Alternately, when the catalyst compound is to used to make the homo-polymer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl)};

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl, or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

$R_2{}^aT$ is a bridge, preferably T is Si or Ge, preferably Si, and each $R^a$, is, independently, hydrogen, halogen, or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful in this invention include one or more of:

(1,3-Dimethylindenyl)(pentamethylcyclopentadienyl)hafniumdimethyl, (1,3,4,7-Tetramethylindenyl)(pentamethylcyclopentadienyl) hafniumdimethyl, (1,3-Dimethylindenyl)(tetramethylcyclopentadienyl)hafniumdimethyl, (1,3-Diethylindenyl)(pentamethylcyclopentadienyl)hafniumdimethyl, (1,3-Dipropylindenyl)(pentamethylcyclopentadienyl)hafniumdimethyl, (1-Methyl,3-propyllindenyl)(pentamethylcyclopentadienyl) hafniumdimethyl, (1,3-Dimethylindenyl)(tetramethylpropylcyclopentadienyl) hafniumdimethyl, (1,2,3-Trimethylindenyl)(pentamethylcyclopentadienyl) hafniumdimethyl, (1,3-Dimethylbenzindenyl)(pentamethylcyclopentadienyl) hafniumdimethyl, (2,7-Bis t-butylfluorenyl)(pentamethylcyclopentadienyl) hafniumdimethyl, (9-Methylfluorenyl)(pentamethylcyclopentadienyl)hafniumdimethyl, (2,7,9-Trimethylfluorenyl)(pentamethylcyclopentadienyl) hafniumdimethyl, μ-Dihydrosilyl-bis(tetramethylcyclopentadienyl)hafniumdimethyl, μ-Dimethylsilyl(tetramethylcyclopentadienyl)(3-propyltrimethylcyclopentadienyl) hafniumdimethyl, μ-Dicyclopropylsilyl(bis tetramethylcyclopentadienyl) hafniumdimethyl, In an alternate embodiment, the "dimethyl" after the transition metal in the list of catalyst compounds above is replaced with a dihalide (such as dichloride, dibromide, or difluoride) or a bisphenoxide, particularly for use with an alumoxane activator.

Preferred activators useful with the above include: dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H] [(C$_6$F$_3$(C$_6$F$_5$)$_2$)$_4$B] (where Ph is phenyl and Me is methyl).

In another embodiment, the vinyl terminated polyolefins useful here in may be produced using the catalyst compound represented by the formula:

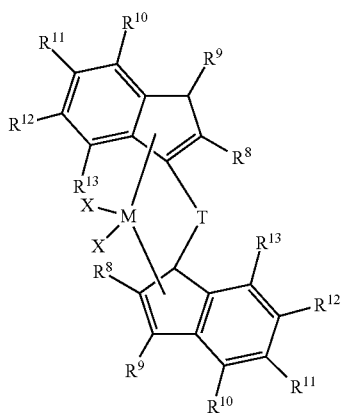

where M is hafnium or zirconium (preferably hafnium); each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is independently selected from halides and C$_1$ to C$_5$ alkyl groups, preferably each X is a methyl group); each R$^8$ is, independently, a C$_1$ to C$_{10}$ alkyl group (preferably methyl, ethyl, propyl, butyl, pentyl, hexyl, or isomers thereof, preferably each R$^8$ is a methyl group); each R$^9$ is, independently, a C$_1$ to C$_{10}$ alkyl group (preferably methyl, ethyl, propyl, butyl, pentyl, hexyl, or isomers thereof, preferably each R$^9$ is a n-propyl group); each R$^{10}$ is hydrogen; each R$^{11}$, R$^{12}$, and R$^{13}$, is, independently, hydrogen or a substituted or unsubstituted hydrocarbyl group, a heteroatom or heteroatom containing group (preferably hydrogen); T is a bridging group (preferably T is dialkyl silicon or dialkyl germanium, preferably T is dimethyl silicon); and further provided that any of adjacent R$^{11}$, R$^{12}$, and R$^{13}$ groups may form a fused ring or multicenter fused ring system where the rings may be aromatic, partially saturated or saturated. For further information on such catalyst compounds and their use to make vinyl terminated macromers, please see concurrently filed U.S. Ser. No. 13/072,280, filed Mar. 25, 2011, entitled "Novel Catalysts and Methods of Use Thereof to Produce Vinyl Terminated Polymers".

Catalyst compounds that are particularly useful in this invention include one or more of:

rac-dimethylsilyl bis(2-methyl,3-propylindenyl)hafniumdimethyl, rac-dimethylsilyl bis(2-methyl,3-propylindenyl)zirconiumdimethyl, rac-dimethylsilyl bis(2-ethyl,3-propylindenyl)hafniumdimethyl, rac-dimethylsilyl bis(2-ethyl,3-propylindenyl)zirconiumdimethyl, rac-dimethylsilyl bis(2-methyl,3-ethylindenyl)hafniumdimethyl, rac-dimethylsilyl bis(2-methyl,3-ethylindenyl)zirconiumdimethyl, rac-dimethylsilyl bis(2-methyl,3-isopropylindenyl)hafniumdimethyl, rac-dimethylsilyl bis(2-methyl,3-isopropylindenyl)zirconiumdimethyl, rac-dimethylsilyl bis(2-methyl,3-butylindenyl)hafniumdimethyl, rac-dimethylsilyl bis(2-methyl,3-butylindenyl)zirconiumdimethyl, rac-dimethylgermanyl bis(2-methyl,3-propylindenyl)hafniumdimethyl, rac-dimethylgermanyl bis(2-methyl,3-propylindenyl)zirconiumdimethyl, rac-dimethylgermanyl bis(2-ethyl,3-propylindenyl)hafniumdimethyl, rac-dimethylgermanyl bis(2-ethyl,3-propylindenyl)zirconiumdimethyl, rac-dimethylgermanyl bis(2-methyl,3-ethylindenyl)hafniumdimethyl, rac-dimethylgermanyl bis(2-methyl,3-ethylindenyl)zirconiumdimethyl, rac-dimethylgermanyl bis(2-methyl,3-isopropylindenyl)hafniumdimethyl, rac-dimethylgermanyl bis(2-methyl,3-isopropylindenyl)zirconiumdimethyl, rac-dimethylgermanyl bis(2-methyl,3-butylindenyl)hafniumdimethyl, rac-dimethylgermanyl bis(2-methyl,3-propylindenyl)zirconiumdimethyl, rac-dimethylsilyl bis(2-propyl,3-methylindenyl)hafniumdimethyl, rac-dimethylsilyl bis(2-propyl,3-methylindenyl)zirconiumdimethyl, rac-dimethylsilyl bis(2-propyl,3-ethylindenyl)hafniumdimethyl, rac-dimethylsilyl bis(2-propyl,3-ethylindenyl)zirconiumdimethyl, rac-dimethylsilylbis(2-propyl,3-butylindenyl)hafniumdimethyl, rac-dimethylsilylbis(2-propyl,3-butylindenyl)zirconiumdimethyl, rac-dimethylsilyl bis(2-methyl,3-butylindenyl)hafniumdimethyl, rac-dimethylsilyl bis(2-methyl,3-butylindenyl)zirconium-dimethyl, rac-dimethylsilyl bis(2,3-dimethyl)hafniumdimethyl, rac-dimethylsilyl bis(2,3-dimethyl)zirconiumdimethyl, rac-dimethylgermanyl bis(2-propyl,3-methylindenyl)hafniumdimethyl, rac-dimethylgermanyl bis(2-propyl,3-methylindenyl)zirconiumdimethyl, rac-dimethylgermanyl bis(2-propyl,3-ethylindenyl)hafniumdimethyl, rac-dimethylgermanyl bis(2-propyl,3-ethylindenyl)zirconiumdimethyl, rac-dimethylgermanyl bis(2-propyl,3-butylindenyl)hafniumdimethyl, rac-dimethylgermanyl bis(2-propyl,3-butylindenyl)zirconiumdimethyl, rac-dimethylgermanyl bis(2-methyl,3-butylindenyl)hafniumdimethyl, rac-dimethylgermanyl bis(2-methyl,3-butylindenyl)zirconiumdimethyl, rac-dimethylgermanyl bis(2,3-dimethyl)hafniumdimethyl, and rac-dimethylgermanyl bis(2,3-dimethyl)zirconiumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the catalyst compound is rac-dimethylsilylbis(2-methyl,3-propylindenyl)hafniumdimethyl or dichloride, or rac-dimethylsilylbis(2-methyl,3-propylindenyl)zirconiumdimethyl or dichloride.

Preferred activators useful with the above include:
dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri (n-butyl)ammonium tetrakis(perfluorobiphenyl)borate, tri (t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, and [4-t-butyl-PhNMe$_2$H] [($C_6F_3(C_6F_5)_2$)$_4$B] (where Ph is phenyl and Me is methyl).

Preferred combinations of catalyst and activator include: N,N-dimethylanilinium tetrakis(perfluorobiphenyl)borate and rac-dimethylsilylbis(2-methyl,3-propylindenyl)hafniumdimethyl, or rac-dimethylsilylbis(2-methyl,3-propylindenyl)zirconiumdimethyl.

In another embodiment the vinyl terminated polyolefins useful herein may be produced using the catalyst compound represented by the formula:

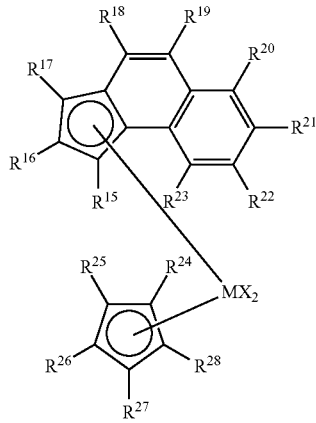

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group (preferably a $C_1$ to $C_8$ linear alkyl group, preferably methyl ethyl, propyl, butyl, pentyl, hexyl, heptyl or octyl); and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms (preferably 1 to 6 carbon atoms, preferably a substituted or unsubstituted $C_1$ to $C_8$ linear alkyl group, preferably methyl ethyl, propyl, butyl, pentyl, hexyl, heptyl, octyl). In a preferred embodiment, at least three of $R^{24}$-$R^{28}$ groups are not hydrogen (alternately four of $R^{24}$-$R^{28}$ groups are not hydrogen, alternately five of $R^{24}$-$R^{28}$ groups are not hydrogen). In a preferred embodiment, all five groups of $R^{24}$-$R^{28}$ are methyl. In a preferred embodiment, four of the $R^{24}$-$R^{28}$ groups are not hydrogen and at least one of the $R^{24}$-$R^{28}$ groups is a $C_2$ to $C_8$ substituted or unsubstituted hydrocarbyl (preferably at least two, three, four or five of $R^{24}$-$R^{28}$ groups are a $C_2$ to $C_8$ substituted or unsubstituted hydrocarbyl). In another preferred embodiment, $R^{15}$ and $R^{17}$ are methyl groups, $R^{16}$ is a hydrogen, $R^{18}$-$R^{23}$ are all hydrogens, $R^{24}$-$R^{28}$ are all methyl groups, and each X is a methyl group. For further information on such catalyst compounds and their use to make vinyl terminated macromers, please see concurrently filed U.S. Ser. No. 13/072,279, filed Mar. 25, 2011, entitled "Enhanced Catalyst Performance for Production of Vinyl Terminated Propylene and Ethylene/Propylene Macromers."

Catalyst compounds that are particularly useful in this invention include (CpMe$_5$)(1,3-Me$_2$-benz[e]indenyl)HfMe$_2$, (CpMe$_5$)(1-methyl-3-n-propylbenz[e]indenyl)HfMe$_2$, (CpMe$_5$)(1-n-propyl,3-methylbenz[e]indenyl)HfMe$_2$, (CpMe$_5$)(1-methyl-3-n-butylbenz[e]indenyl)HfMe$_2$, (CpMe$_5$)(1-n-butyl,3-methylbenz[e]indenyl)HfMe$_2$, (CpMe$_5$)(1-ethyl,3-methylbenz[e]indenyl)HfMe$_2$, (CpMe$_5$) (1-methyl, 3-ethylbenz[e]indenyl)HfMe$_2$, (CpMe$_4$n-propyl) (1,3-Me$_2$-benz[e]indenyl)HfMe$_2$, (CpMe$_4$-n-propyl)(1-methyl-3-n-propylbenz[e]indenyl)HfMe$_2$, (CpMe$_4$-n-propyl) (1-n-propyl,3-methylbenz[e]indenyl)HfMe$_2$, (CpMe$_4$-n-propyl)(1-methyl-3-n-butylbenz[e]indenyl)HfMe$_2$, (CpMe$_4$-n-propyl)(1-n-butyl,3-methylbenz[e]indenyl)HfMe$_2$, (CpMe$_4$-n-propyl) (1-ethyl,3-methylbenz[e]indenyl)HfMe$_2$, (CpMe$_4$-n-propyl)(1-methyl, 3-ethylbenz[e]indenyl)HfMe$_2$, (CpMe$_4$n-butyl)(1,3-Me$_2$-benz[e]indenyl)HfMe$_2$, (CpMe$_4$n-butyl) (1-methyl-3-n-propylbenz[e]indenyl)HfMe$_2$, (CpMe₄n-butyl)(1-n-propyl,3-methylbenz[e]indenyl)
HfMe₂, (CpMe₄n-butyl)(1-methyl-3-n-butylbenz[e]indenyl)
HfMe₂, (CpMe₄n-butyl)(1-n-butyl,3-methylbenz[e]indenyl)
HfMe₂, (CpMe₄n-butyl)(1-ethyl,3-methylbenz[e]indenyl)
HfMe₂, (CpMe₄n-butyl)(1-methyl, 3-ethylbenz[e]indenyl)
HfMe₂, and the zirconium analogs thereof.

In an alternate embodiment, the "dimethyl" (Me₂) after the transition metal in the list of catalyst compounds above is replaced with a dihalide (such as dichloride or difluoride) or a bisphenoxide, particularly for use with an alumoxane activator.

Other activators useful with the above catalysts include: dimethylaniliniumtetrakis(pentafluorophenyl)borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri (n-butyl)ammonium tetrakis(perfluorobiphenyl)borate, tri (t-butyl)ammonium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, and [4-t-butyl-PhNMe₂H] [(C₆F₃(C₆F₅)₂)₄B].

In a preferred embodiment the branched polymers described herein may be produced as described in concurrently filed U.S. Ser. No. 61/467,681, filed Mar. 25, 2011, entitled "Branched Vinyl Terminated Polymers and Methods for Production Thereof".

With regard to the above catalyst compounds, the term "substituted" means that a hydrogen group has been replaced with a hydrocarbyl group, a heteroatom or a heteroatom containing group. For example, methyl cyclopentadiene (Cp) is a Cp group substituted with a methyl group and ethyl alcohol is an ethyl group substituted with an —OH group.

Activators and Activation Methods for Catalyst Compounds to Make Vinyl Terminated Polymers The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally polymeric compounds containing —Al(R¹)—O— subunits, where R¹ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1 alternately from 1:1 to 50:1.

In a preferred embodiment, little or no alumoxane is used in the process to produce the vinyl terminated polyolefin. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the VTM's then, the alumoxane has been treated to remove free alkyl aluminum compounds, particularly trimethyl aluminum.

Further, in a preferred embodiment, the activator used herein to produce the vinyl terminated polyolefin is bulky as defined herein and is discrete.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

Ionizing Activators

It is within the scope of this invention to use an ionizing or stoichiometric activator, neutral or ionic non-coordinating anion (as defined in U.S. Ser. No. 12/143,663, filed on Jun. 20, 2008), such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators. Preferably, the activator is N,N-dimethylanilinium tetrakis(perfluoronaphthyl)borate, N,N-dimethylanilinium tetrakis(perfluorobiphenyl)borate, N,N-dimethylanilinium tetrakis (3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, or triphenylcarbenium tetrakis (perfluorophenyl)borate. For additional activators useful herein, please see U.S. Ser. No. 12/143,663, filed on Jun. 20, 2008.

In another embodiment, the activator is a bulky activator represented by the formula:

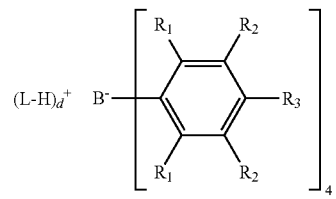

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3 $V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
|---|---|---|---|---|---|
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |

-continued

| Activator | Structure of boron substituents | Molecular Formula of each substituent | $V_s$ | MV Per subst. (Å³) | Total MV (Å³) |
|---|---|---|---|---|---|
| [4-t-butyl-PhNMe$_2$H][(C$_6$F$_3$(C$_6$F$_5$)$_2$)$_4$B] | 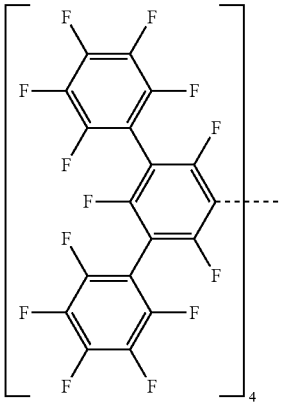 | C$_{18}$F$_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

The typical activator-to-catalyst-precursor ratio is a 1:1 molar ratio for non-alumoxane activators. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

In another embodiment, a vinyl terminated polyolefin can be produced by the method disclosed in Macromol. Chem. Phys., 2010, 211, pp. 1472-1481.

Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania and the like. Preferred support materials include Al$_2$O$_3$, ZrO$_2$, SiO$_2$, and combinations thereof, more preferably SiO$_2$, Al$_2$O$_3$, or SiO$_2$/Al$_2$O$_3$.

It is preferred that the support material, most preferably an inorganic oxide, has a surface area in the range of from about 10 to about 700 m²/g, pore volume in the range of from about 0.1 to about 4.0 cc/g and average particle size in the range of from about 5 to about 500 µm. More preferably, the surface area of the support material is in the range of from about 50 to about 500 m²/g, pore volume of from about 0.5 to about 3.5 cc/g and average particle size of from about 10 to about 200 µm. Most preferably, the surface area of the support material is in the range is from about 100 to about 400 m²/g, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m²/gm; pore volume of 1.65 cm³/gm), examples of which are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. The slurry of the support material in the solvent is prepared by introducing the support material into the solvent, and heating the mixture to about 0 to about 70° C., preferably to about 25 to about 60° C., preferably at room temperature. Contact times typically range from about 0.5 hours to about 24 hours, from about 0.5 hours to about 8 hours, or from about 0.5 hours to about 4 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of B to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

Amine Functionalized Polyolefins

This invention further relates to amine-functionalized polyolefins, preferably represented by the formula:

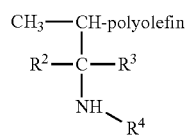

where $R^2$ and $R^3$ are each, independently, hydrogen or a $C_1$ to $C_{20}$ group, preferably a $C_1$ to $C_{20}$ alkyl group; $R^4$ is an aryl or alkyl group, preferably a $C_1$ to $C_{20}$ alkyl or $C_6$ to $C_{20}$ aryl group; and polyolefin is a homopolymer or copolymer of $C_2$ to $C_{40}$ olefin.

Preferably, this invention relates to amine-functionalized polyolefins represented by the formula:

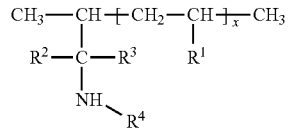

where $R^1$ is either hydrogen, or a $C_1$ to $C_{18}$ group (preferably methyl, ethyl, butyl, hexyl, or octyl); $R^2$ and $R^3$ are each, independently hydrogen or a $C_1$ to $C_{20}$ group, preferably a $C_1$ to $C_{20}$ alkyl group; $R^4$ is an aryl, substituted aryl, alkyl or substituted alkyl group, preferably a $C_1$ to $C_{20}$ alkyl or substituted alkyl, or $C_6$ to $C_{20}$ aryl or substituted aryl group; and x is a number greater than 12, preferably from 12 to 5000, preferably from 15 to 2500, preferably 20 to 2000.

In a preferred embodiment, the amine functionalized polyolefin has an Mn of from 500 to 60,000 g/mol, preferably from 1000 to 50,000 g/mol, preferably from 1000 to 25,000 g/mol. In a preferred embodiment the "polyolefin" portion of the amine functionalized polyolefin is a homopolymer or copolymer comprising one or more $C_2$ to $C_{40}$ olefins, preferably $C_2$ to $C_{40}$ alpha olefins, preferably ethylene, propylene, butene, pentene, hexene, octene, nonene, decene, undecene, dodecene. Preferably, the amine functionalized polyolefin is as described above for the vinyl terminated polyolefin, except that the vinyl group is substantially reduced or no longer present. In a preferred embodiment, the Bromine number of the amine terminated polyolefin is at least 50%, preferably at least 75%, preferably at least 100% less than the Bromine number of the starting vinyl terminated polyolefins. Bromine number is determined by ASTM D 1159.

In a preferred embodiment, the amine functionalized polyolefin is a polymer having an Mn of from 500 to 21,000 g/mol (preferably 700 to 21,000, preferably 800 to 20,000 g/mol) comprising one or more alpha olefins selected from the group consisting of $C_2$ to $C_{40}$ alpha olefins, preferably ethylene, propylene, butene, pentene, hexene, octene, nonene, decene, undecene, dodecene. Preferably, the polymer portion of the amine functionalized polyolefin is an ethylene polymer, e.g., a homopolymer of ethylene or copolymer of ethylene and up to 50 mol % (preferably from 0.5 to 25 mol %, preferably from 1 to 20 mol %) of one or more $C_2$ to $C_{40}$ alpha olefin comonomers, preferably selected from the group consisting of propylene, butene, pentene, hexene, octene, nonene, decene, undecene, and dodecene. Alternately, the polymer portion of the amine functionalized polyolefin is a propylene polymer, e.g., a homopolymer of propylene or copolymer of propylene and up to 50 mol % (preferably from 0.5 to 25 mol %, preferably from 1 to 20 mol %) of one or more $C_2$ to $C_{40}$ alpha olefin comonomers, preferably selected from the group consisting of ethylene, butene, pentene, hexene, octene, nonene, decene, undecene, and dodecene.

In a preferred embodiment, the amine functionalized polyolefin is a polymer having an Mn of greater than 21,000 g/mol (preferably from 25,000 to 100,000, preferably 25,000 to 50,000 g/mol) comprising one or more alpha olefins selected from the group consisting of $C_2$ to $C_{40}$ alpha olefins, preferably ethylene, propylene, butene, pentene, hexene, octene, nonene, decene, undecene, and dodecene. Preferably, the polymer portion of the amine functionalized polyolefin is an ethylene polymer, e.g., a homopolymer of ethylene or copolymer of ethylene and up to 50 mol % (preferably from 0.5 to 25 mol %, preferably from 1 to 20 mol %) of one or more $C_3$ to $C_{40}$ alpha olefin comonomers, preferably selected from the group consisting of propylene, butene, pentene, hexene, octene, nonene, decene, undecene, and dodecene. Alternately, the polymer portion of the amine functionalized polyolefin is propylene polymer, e.g., a homopolymer of propylene or a copolymer of propylene and up to 50 mol % (preferably from 0.5 to 25 mol %, preferably from 1 to 20 mol %) of one or more $C_2$ to $C_{40}$ alpha olefins comonomers, preferably selected from the group consisting of ethylene, butene, pentene, hexene, octene, nonene, decene, undecene, and dodecene.

In another embodiment, the amine functionalized polyolefins consist essentially of propylene, functional group and optionally ethylene. Alternately $C_4$ olefins (such as isobutylene, butadiene, n-butene) are substantially absent from the amine functionalized polyolefins. Alternately, $C_{4-20}$ olefins are substantially absent from the amine functionalized polyolefins. Alternately, isobutylene is substantially absent from the amine functionalized polyolefins. By substantially absent is meant that the monomer is present in the polyolefin at 1 wt % or less, preferably at 0.5 wt % or less, preferably at 0 wt %.

In some embodiments, the amine functionalized polyolefins produced herein have a melting point (DSC, second melt) of 100° C. or more, preferably 120° C. or more, preferably 130° C. or more. In another preferred embodiment, the amine functionalized polyolefin produced herein is an amine functionalized propylene polymer having a melting point (DSC, second melt) of 145° C. or more, preferably 150° C. or more, preferably 155° C. or more. In another preferred embodiment, the amine functionalized polyolefin produced herein is an amine functionalized ethylene polymer having a melting point (DSC, second melt) of 100° C. or more, preferably 110° C. or more, preferably 125° C. or more.

In some embodiments, the amine functionalized polyolefins produced herein have a heat of fusion of (DSC, second melt) from 0 to 90 J/g, preferably 5 to 75 preferably 10 to 50 J/g.

The amine functionalized polyolefins may be characterized by any degree of tacticity, including isotacticity or syndiotacticity, and/or may be atactic. In an embodiment, the amine functionalized polyolefin has more than 50% meso dyads as measured by $^{13}$C-NMR, preferably more than 60%. In an alternate embodiment, the amine functionalized polyolefin has more than 50% racemic dyads as measured by $^{13}$C-NMR, preferably more than 60%.

Particularly useful amine functionalized polyolefins may be isotactic, highly isotactic, syndiotactic, or highly syndiotactic propylene polymer, particularly isotactic polypropylene. In a desirable embodiment, the amine functionalized polyolefin (preferably polypropylene) has at least 85% isotacticity. In another embodiment, the amine functionalized polyolefin (preferably polypropylene) has at least 85% syndiotacticity.

Particularly useful amine functionalized polyolefins may be amorphous, e.g., have less than 10% isotactic or syndiotactic pentads.

In a preferred embodiment, the amine functionalized polyolefins described herein have less than 10% allyl chain ends, preferably less than 8%, preferably less than 6%, preferably less than 5%, preferably less than 4%, preferably less than 3%, preferably less than 2%, preferably less than 1% (relative to total unsaturations as measured by $^1$H NMR, using the protocol described in U.S. Ser. No. 12/143,663, filed on Jun. 20, 2008). No hydrogen or chain transfer/termination agent should be used during functionalization, derivatization or stripping (of unreacted monomer) for measurement of unsaturations.

The percent functionalization is determined by $^1$H NMR. The instrument used is a 400 MHz Varian pulsed fourier transform NMR spectrometer equipped with a variable temperature proton detection probe operating at 120° C. The sample (approx. 20 mg) is dissolved in 1 mL of 1,1,2,2-tetrachloroethane-d$_2$ (TCE-d$_2$) or CDCl$_3$ and transferred into a 5 mm glass NMR tube. (The solvent has less than 10,000 ppm water and is free of other contaminants that could change the chemical shifts in the NMR spectrum). Acquisition parameters are pulse width=45°, acquisition delay=8 s and number of scans=120, when the Mn is less than 5000 g/mol, number of scans=500 when the Mn is from 5000 to 20,000 g/mol and the number of scans is 1000 when the Mn is 20,000 g/mol. Chemical shifts are determined relative to the residual TCE-d$_1$ signal which is set to 5.98 ppm and residual CHCl$_3$ which is set at 7.24 ppm. VRA is the normalized integrated signal intensity for the vinyls with shifts between from about 4.9 to 5.1 ppm. A is the normalized intetrated signal intensity for the aryl group from the amine-functionalized polyolefin (when the aryl is present on the amine), which are typically observed as three resonances between 6.5 and 7.3 ppm. Q is the normalized intetrated signal intensity for the methylenes between the nitrogen of the amine and the polyolefin chain which are typically observed at resonances of 2.7 to 3.2 ppm. VDRA is the normalized integrated signal intensity for the vinylidene resonances between from about 4.65 to 4.85 ppm and the vinylene resonances at from about 5.15 to 5.6 ppm. IA is the normalized integrated signal intensities for the aliphatic region of interest between from about 0 to 2.1 ppm. The number of amine groups/1000 Carbons (VA) is determined from the formula: VA=(Q*1000)/(IA+VRA+VDRA+Q), except that when an aryl group is present on the amine, the number of amine groups/1000 Carbons (VA") is determined from the formula: VA"=(A*400)/(IA+VRA+VDRA+A). The number of vinyl groups/1000 Carbons (VI) is determined from the formula: VI=(VRA*1000)/(IA+VRA+VDRA).

Likewise, the number of vinylidene & vinylene groups/1000 carbons (VE) is determined from the formula: VE=(VDRA*1000)/(Q+IA+VRA+VDRA), unless an aryl group is present on the amine, then number of vinylidene & vinylene groups/1000 carbons (VE") is determined from the formula: VE"=(VDRA*1000)/(A+IA+VRA+VDRA). A, Q, VRA, VDRA, and IA are the normalized integrated signal intensities in the chemical shift regions defined above. In the event the product polyolefin is oxidized or the methylenes are obscured, $^{13}C$ NMR should be used as described in WO 2009/155471 at paragraph [0095] and [0096] except that the spectra are referenced to the chemical shift of the solvent, tetrachloroethane-$d_2$.

The percent amine functionalization is defined as 100*[VA/(VA+VI+VE)], unless an aryl group is present on the amine, then the percent amine functionalization is defined as 100*[VA"/(VA+VI+VE")]. Preferably the percent amine functionalization of the polyolefin produced herein is 30% or more, 40% or more, 50% or more, 60% or more, 70% or more, 75% or more, preferably 80% or more, preferably 90% or more, preferably 95% or more. In a preferred embodiment, the amine groups/1000 Carbons (VA) is from 2 to 333, preferably from 10 to 333, preferably from 20 to 333. In an alternate embodiment, the amine groups/1000 Carbons (VA) is 0.25 to 333, preferably from 0.35 to 333, preferably 0.35 to 35, preferably 0.45 to 35, preferably 0.6 to 35, preferably 1 to 35, preferably from 1 to 10. In another embodiment, the number of methines per 1000 Carbons (MA) is determined by the formula: MA=(M*2000)/(IA+VRA+VDRA+M), where M is the normalized integrated signal intensity for the methine typically observed at 1.7 to 1.85 ppm, and MA is preferably from 2 to 333, preferably from 10 to 333, preferably from 20 to 333, alternately MA is 0.25 to 333, preferably from 0.35 to 333, preferably 0.35 to 35, preferably 0.45 to 35, preferably 0.6 to 35, preferably 1 to 35, preferably from 1 to 10. In another embodiment, the ratio of VRA:VDRA of the functionalized product polyolefin is less than 10:1, preferably less than 5:1, preferably less than 2:1, preferably less than 1.5:1. In another embodiment, the residual unsaturations in the functionalized polyolefin produced herein is less than 100 per 1000 Carbon atoms, preferably less than 80 per 1000 Carbon atoms, preferably less than 70 per 1000 Carbon atoms, preferably less than 50 per 1000 Carbon atoms, preferably less than 20 per 1000 Carbon atoms, preferably less than 10 per 1000 Carbon atoms, preferably less than 5 per 1000 Carbon atoms, preferably less than 1 per 1000 Carbon atoms, preferably less than 0.25 per 1000 Carbon atoms.

In another embodiment, the ratio of VI of the functionalized polymer produced herein ($VI_{final}$) to the VI of the vinyl terminated polyolefin starting materials ($VI_{vtp}$), e.g., $VI_{final}/VI_{vtp}$ is 0.75 or less, preferably 0.7 or less, preferably 0.6 or less, preferably 0.5 or less, preferably 0.4 or less, preferably 0.3 or less, preferably 0.2 or less, preferably 0.1 or less, preferably 0.05 or less.

In another embodiment, the ratio of VA of the functionalized polymer produced herein ($VA_{final}$) to the VI of the vinyl terminated polyolefin starting materials ($VI_{vtp}$), e.g., $VA_{final}/VI_{vtp}$ is from 0.3 to 1.2, preferably from 0.4 to 1.1, preferably from 0.5 to 1.0, preferably from 0.6 to 1.0, preferably from 0.7 to 1.0, preferably 0.8 to 1.0, preferably 0.9 to 1.0.

In another embodiment, the amine functionalized polyolefin produced herein has a branching index, $g'_{vis}$ (as determined by GPC), of 0.98 or less, alternately 0.96 or less, alternately 0.95 or less, alternately 0.93 or less, alternately 0.90 or less, alternately 0.85 or less, alternately 0.80 or less, alternately 0.75 or less, alternately 0.70 or less, alternately 0.65 or less, alternately 0.60 or less, alternately 0.55 or less.

Derivatization

The functionalized vinyl terminated polyolefins described herein may be further derivatized as described in U.S. Pat. No. 6,022,929. For example, the amine groups will react with electrophiles to form products with new covalent bonds. Examples of carbon-based electrophiles include aldehydes, ketones, anhydrides, cyclic anhydrides, and halocarbons. Examples of silicon-based electrophiles include chlorosilanes, fluorosilanes, and bromosilanes. Reaction of functionalized vinyl terminated polyolefin (i.e., amine functionalized olefin) with a maleated polyolefin would form a new polyolefin product with a blocky structure, assuming that the two polyolefins were chosen to differ from each other.

In a preferred embodiment, the amine functionalized polyolefins described herein have been derivitized: i) by reaction with an electrophile (such as a carbon or silicon-based electrophile); ii) with a molecule containing any of the following functional groups: ketone, aldehyde, cyclic anhydride, bromide, chloride, iodide, fluoride; or iii) with a molecule containing a chlorosilane, bromosilane, or fluorosilane group.

Blends of Amine Functionalized Polyolefins

In some embodiments, the amine functionalized (and optionally derivatized) polyolefins produced by this invention may used alone or blended with other polymers. Typically the amine functionalized (and optionally derivatized) polyolefins are present at 99.9 to 0.1 wt % (typically at from 5 to 99.8 wt %, alternately from 10 to 99 wt %) in a blend with one or more other polymers, including but not limited to, thermoplastic polymer(s) and/or elastomer(s), based upon the weight of the blend.

In some embodiments, the amine functionalized (and optionally derivatized) polyolefins produced by this invention may be blended with 0.1 to 99.9 wt % (typically at from 0.2 to 95 wt %, alternately from 1 to 90 wt %, based upon the weight of the blend) of a one or more other polymers, including but not limited to, thermoplastic polymer(s) and/or elastomer(s), based upon the weight of the blend.

By "thermoplastic polymer(s)" is meant a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and/or butene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS, and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the amine functionalized (and optionally derivatized) polyolefins produced herein may further be combined with one or more of polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers, such as polystyrene, poly-1 esters, polyacetal, polyvinylidine fluoride, polyethylene glycols, and/or polyisobutylene. Preferred polymers include those available from ExxonMobil Chemical Company in Baytown, Tex. under the tradenames EXCEED™ and EXACT™.

Tackifiers may be blended with the amine functionalized (and optionally derivatized) polyolefins produced herein and/or with blends of the amine functionalized (and optionally derivatized) polyolefins produced by this invention (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %.

In another embodiment, the amine functionalized (and optionally derivatized) polyolefins of this invention, and/or blends thereof, further comprise typical additives known in the art, such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as 0.001 wt % to 10 wt %. Preferred fillers, cavitating agents and/or nucleating agents include titanium dioxide, calcium carbonate, barium sulfate, silica, silicon dioxide, carbon black, sand, glass beads, mineral aggregates, talc, clay, inorganic or metallic particles (preferably graphene; graphene oxide, single wall nanotubes and multi wall nanotubes), and the like. Preferred antioxidants include phenolic antioxidants, such as Irganox 1010, Irganox, 1076 both available from Ciba-Geigy. Preferred oils include paraffinic or naphthenic oils such as Primol 352, or Primol 876 available from ExxonMobil Chemical France, S.A. in Paris, France. More preferred oils include aliphatic naphthenic oils, white oils or the like.

In a particularly preferred embodiment, the amine functionalized (and optionally derivatized) polyolefins produced herein are combined with polymers (elastomeric and/or thermoplastic) having anhydride, acid or isocyanate functional groups under conditions such that they react. Reaction may be confirmed by an at least 20% (preferably at least 50%, preferably at least 100%) increase in Mw as compared to the Mw of the amine functionalized polyolefin prior to reaction. Such reaction conditions may be increased heat (for example, above the Tm of the amine functionalized polyolefin), increased shear (such as from a reactive extruder), presence or absence of solvent, and the like. Useful polymers having functional groups that can be reacted with the amine functionalized polyolefins produced herein include polyesters, polyvinyl acetates, nylons (polyamides), polybutadiene, nitrile rubber, hydroxylated nitrile rubber, ethylene-acrylic acid copolymers and terpolymers, as well as ionomers.

In some embodiments, the amine functionalized (and optionally derivatized) polyolefin of this invention may be blended with up to 99.9 wt % (preferably up to 99 wt %, preferably up to 98 wt %, preferably from 0.1 to 99.9 wt %, from 1 to 98 wt %), based upon the weight of the composition, of one or more additional polymers. Suitable polymers include:

PM1) Polyethylenes, including (but not limited to):
  Copolymers of ethylene and one or more polar monomers, preferably selected from vinyl acetate, methyl acrylate, n-butyl acrylate, acrylic acid, and vinyl alcohol (i.e., EVA, EMA, EnBA, EAA, and EVOH); ethylene polymers and copolymers, ethylene homopolymers and copolymers synthesized using a high-pressure free radical process, including LDPE; copolymers of ethylene and C$_3$ to C$_{40}$ olefins (preferably propylene and/or butene) with a density of greater than 0.91 g/cm$^3$ to less than 0.94 g/cm$^3$), including LLDPE; high density PE (0.94 to 0.98 g/cm$^3$); and polyethylene as describe in US 2006/0173123, particularly at paragraphs [0136] to [0168].

PM2) Polybutene-1 and copolymers of polybutene-1 with ethylene and/or propylene.

PM3) Non-EP Rubber Elastomers, including (but not limited to):
  Polyisobutylene, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans), hydrogenated carboxylated nitrile butadiene rubber, i.e., HXNBR (such as TherbanXT VP KA 8889, the Mooney viscosity ML (1+4)100° C. is 77±7) containing 33% acrylonitrile, 5% carboxylic acid and 3.5% residual double bonds, made by LANXESS Germany).

PM4) Low-crystallinity propylene/olefin copolymers, preferably random copolymers, comprising:
  i) at least 70 wt % propylene, and
  ii) 5 to 30 wt % (preferably 5 to 20 wt %) of comonomer selected from ethylene and C$_4$ to C$_{12}$ olefins (preferably selected from ethylene, butene, and hexene; preferably ethylene);
  preferably made using a metallocene-type catalyst; and having one or more of the following properties:

a) $M_w$ of 20 to 5,000 kg/mol (preferably 30 to 2,000 kg/mol, preferably 40 to 1,000 kg/mol, preferably 50 to 500 kg/mol, preferably 60 to 400 kg/mol); and/or
b) molecular weight distribution index ($M_w/M_n$) of 1.5 to 10 (preferably 1.7 to 5, preferably 1.8 to 3); and/or
c) GPC-determined g' index value of 0.9 or greater (preferably 0.95 or greater, preferably 0.99 or greater); and/or
d) density of 0.85 to about 0.90 g/cm$^3$ (preferably 0.855 to 0.89 g/cm$^3$, preferably 0.86 to about 0.88 g/cm$^3$); and/or
e) melt flow rate (MFR) of at least 0.2 dg/min (preferably 1-500 dg/min, preferably 2-300 dg/min); and/or
f) heat of fusion ($H_f$) of 0.5 J/g or more (preferably 1 J/g or more, preferably 2.5 J/g or more, preferably 5 J/g or more) but less than or equal to 75 J/g (preferably less than or equal to 50 J/g, preferably less than or equal to 35 J/g, preferably less than or equal to 25 J/g); and/or
g) DSC-determined crystallinity of from 1 wt % to 30 wt % (preferably 2 wt % to 25 wt %, preferably 2 wt % to 20 wt %, preferably 3 wt % to 15 wt %); and/or
h) a single broad melting transition with a peak melting point of 25 to about 105° C. (preferably 25 to 85° C., preferably 30 to 70° C., preferably 30 to 60° C.), where the highest peak considered the melting point; and
i) crystallization temperature ($T_a$) of 90° C. or less (preferably 60° C. or less); and/or
j) greater than 80% of the propylene residues (exclusive of any other monomer such as ethylene) arranged as 1,2 insertions with the same stereochemical orientation of the pendant methyl groups, either meso or racemic, as determined by $^{13}$C-NMR; and/or
k) $^{13}$C-NMR-determined propylene tacticity index of more than 1; and/or
l) $^{13}$C-NMR-determined mm triad tacticity index of 75% or greater (preferably 80% or greater, preferably 82% or greater, preferably 85% or greater, preferably 90% or greater).

Useful low-crystallinity propylene/olefin copolymers are available from ExxonMobil Chemical; suitable examples include Vistamaxx™ 6100, Vistamaxx™ 6200 and Vistamaxx™ 3000. Other useful low-crystallinity propylene/olefin copolymers are described in WO 03/040095, WO 03/040201, WO 03/040233, and WO 03/040442, all to Dow Chemical, which disclose propylene-ethylene copolymers made with non-metallocene catalyst compounds. Still other useful low-crystallinity propylene/olefin copolymers are described in U.S. Pat. No. 5,504,172 to Mitsui Petrochemical. Preferred low-crystallinity propylene/olefin copolymers are described in US 2002/0004575 to ExxonMobil Chemical.

PM5) Propylene homopolymers and copolymers (particularly those having an Melt Flow Rate (ASTM 1238, 2.16 kg, 230° C.) of 0.1 to 500 dg/min, preferably 1 to 200 dg/min), including but not limited to: 1) propylene polymers as described in US 2004/0106723 particularly at paragraphs [0113] to [0196]; 2) propylene polymers as described in US 2008/0045638 particularly at paragraphs [134] to [221]); and 3) propylene polymers suitable for adhesive applications, such as those described in WO 2004/046214, particularly those at pages 8 to 23.

PM6) Olefin block copolymers, including those described in WO 2005/090425, WO 2005/090426, and WO 2005/090427.

PM7) Polyolefins that have been post-reactor functionalized with maleic anhydride or maleic acid (so-called maleated polyolefins), including maleated ethylene polymers, maleated EP Rubbers, and maleated propylene polymers. Preferably, the amount of free acid groups present in the maleated polyolefin is less than about 1000 ppm (preferably less than about 500 ppm, preferably less than about 100 ppm), and the amount of phosphite present in the maleated polyolefin is less than 100 ppm.

PM8) Styrenic Block Copolymers (SBCs), including (but not limited to):
Unhydrogenated SBCs such as SI, SIS, SB, SBS, SIBS, and the like, where S=styrene, I=isobutylene, and B=butadiene; and hydrogenated SBCs, such as SEBS, where EB=ethylene/butene.

PM9) Engineering Thermoplastics, including (but are not limited to):
Polycarbonates, such as poly(bisphenol-a carbonate); polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, and nylon 66/PPS copolymer; polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer, and other aromatic polyesters; nitrile resins, such as polyacrylonitrile (PAN), polymethacrylonitrile, styrene-acrylonitrile copolymers (SAN), methacrylonitrile-styrene copolymers, and methacrylonitrile-styrene-butadiene copolymers; acrylate resins, such as polymethyl methacrylate and polyethylacrylate; polyvinyl acetate (PVAc); polyvinyl alcohol (PVA); chloride resins, such as polyvinylidene chloride (PVDC), and polyvinyl chloride (PVC); fluoride resins, such as polyvinylidene fluoride (PVDF), polyvinyl fluoride (PVF), polychlorofluoroethylene (PCFE), and polytetrafluoroethylene (PTFE); cellulose resins, such as cellulose acetate and cellulose acetate butyrate; polyimide resins, including aromatic polyimides; polysulfones; polyacetals; polylactones; polyketones, including aromatic polyketones; polyphenylene oxide; polyphenylene sulfide; styrene resins, including polystyrene, styrene-maleic anhydride copolymers, and acrylonitrile-butadiene-styrene resin.

PM10) EP Rubbers, including copolymers of ethylene and propylene, and optionally one or more diene monomer(s), where the ethylene content is from 35 to 85 mol %, the total diene content is 0 to 5 mol %, and the balance is propylene with a minimum propylene content of 15 mol %. Typically the EP Rubbers have a density of less than 0.86 g/cc.

PM11) liquid crystals, dispersion of biodegradable polymers as well as naturally occurring polymers.

Preferably, the amine functionalized (and optionally derivatized) polyolefin is blended with one or more of the polymers PM-1 to PM11 described above where the amine functionalized polymer is present at from 0.1 wt % to 99.9 wt %, alternately from 2 wt % to 98 wt %, alternately from 5 wt % to 75 wt %, alternately from 10 wt % to 50 wt %, based upon the weight of the blend. In another embodiment, the amine functionalized polymer produced herein is blended with another polar polymer such as a maleated polymer or a functionalized polymer at from 0.1 wt % to 99.9 wt % amine functionalized polyolefin, alternately from 1 wt % to 99 wt %, alternately from 5 wt % to 75 wt %, alternately 10 wt % to 50 wt %, based upon the weight of the blend. This polar blend can then be used at 0.1 wt % to 99.9 wt %, based upon the weight of the final blend to further modify another polar or non-polar polymer, such as an impact copolymer, or any of PM1 to PM11 listed above.

In another embodiment, the functionalized (and optionally derivatized) polyolefin produced herein may be blended with an epoxy containing material, such as an epoxidized polymer. In a preferred embodiment, the functionalized (and optionally derivatized) polyolefin produced herein may be blended with an epoxidized polymer and the resulting blend preferably has a melting point of 60° C. or less and an Mn of 5000 to 30,000 g/mol.

In another embodiment, the amine functionalized (and optionally derivatized) polyolefins produced herein are used to make block copolymers.

In another embodiment, the amine functionalized (and optionally derivatized) polyolefins produced herein are combined with nanoclays, preferably to cause exfoliation of the clay in a polymer medium.

In a preferred embodiment the ammonium salt of the amine functionalized (and optionally derivatized) polyolefin is used to exfoliate a nanoclay.

The ammonium salt is represented preferably by the formula:

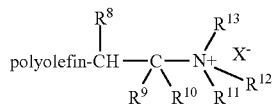

where polyolefin is any polyolefin described above, such as a homopolymer or copolymer of $C_2$ to $C_{40}$ olefin; $R^8$ is H or a $C_1$ to $C_{12}$ alkyl; $R^9$ is H or a $C_1$ to $C_{12}$ alkyl or $C_6$ to $C_{20}$ aryl, $R^{10}$ is H or a $C_1$ to $C_{12}$ alkyl or $C_6$ to $C_{20}$ aryl, $R^{11}$ is H or a $C_1$ to $C_{12}$ alkyl or $C_6$ to $C_{20}$ aryl, $R^{12}$ is H or a $C_1$ to $C_{12}$ alkyl or $C_6$ to $C_{20}$ aryl, $R^{13}$ is a $C_1$ to $C_{12}$ alkyl or $C_6$ to $C_{20}$ aryl, X is an anionic ligand preferably selected from halides, alkoxides, phenolates, amidinates, amidates, sulfonates, acetate, and sulfonates; L is a neutral Lewis base, such as tetrahydrofuran or dimethylamine.

In another embodiment, the amine functionalized (and optionally derivatized) polyolefin produced herein is combined with linear acids made from linear alpha olefins and/or epoxy resins to make biodegradable products.

Applications

The amine functionalized (and optionally derivatized) polyolefins of this invention (and blends thereof as described above) may be used in any known thermoplastic or elastomer application. Examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, membranes, and sealants.

In another embodiment, the amine functionalized (and optionally derivatized) polyolefins described herein can be blended with another polymer (such as a polar polymer, such as an engineering thermoplastic or a maleated polymer) to create a masterbatch. The masterbatch may then be let down with another polymer such as any polymer described herein, particularly any polymer described as PM1 to PM11 above. In a preferred embodiment, the polymer being combined with the master batch is miscible with the masterbatch, e.g., forms a homogeneous blend having a single morphological phase. In other embodiments, the polymer being combined with the master batch is immiscible with the masterbatch, e.g., forms a heterogeneous blend having a two or more morphological phases (as described in US 2008/0045638 at paragraph [0029]). Typically, the masterbatch comprises the amine functionalized (and optionally derivatized) polyolefins at 99.9 wt % to 0.1 wt % (typically at from 5 wt % to 99.8 wt %, alternately from 10 wt % to 99 wt %), based upon the weight of the masterbatch. The master batch may be combined with one or more other polymers at 99.9 wt % to 0.1 wt % (typically at from 5 wt % to 99.8 wt %, alternately from 10 wt % to 99 wt %), based upon the weight of the blend of the polymers and the masterbatch.

A preferred masterbatch comprises maleated polymer and the amine functionalized (and optionally derivatized) polyolefins described herein.

In another embodiment, this invention relates to:

1. A process to produce functionalized polyolefins comprising contacting a transition metal amide catalyst with an alkyl amine (preferably a secondary amine), and one or more vinyl terminated materials (such as vinyl terminated polyolefins, polydienes and/or alpha olefin-diene copolymers), preferably one or more vinyl terminated polyolefins.

2. The process of paragraph 1, wherein the functionalized polyolefin is an amine-functionalized polyolefin represented by the formula:

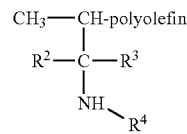

where $R^2$ and $R^3$ are each, independently, hydrogen or a $C_1$ to $C_{20}$ group, preferably a $C_1$ to $C_{20}$ alkyl group; $R^4$ is an aryl or alkyl group, preferably a $C_1$ to $C_{20}$ alkyl or $C_6$ to $C_{20}$ aryl group; and polyolefin is a homopolymer or copolymer of one or more $C_2$ to $C_{40}$ olefin (preferably the polyolefin is a homopolymer or copolymer of ethylene, or a homopolymer or copolymer of propylene).

3. The process of paragraph 1, wherein the functionalized polyolefin is an amine-functionalized polyolefin (preferably an amine functionalized homo- or co-polymer of ethylene or an amine functionalized homo- or co-polymer of propylene) represented by the formula:

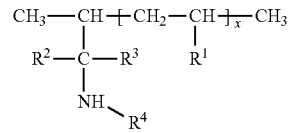

where $R^1$ is either hydrogen, or a $C_1$ to $C_{18}$ group (preferably methyl, ethyl, butyl, hexyl, or octyl); $R^2$ and $R^3$ are each, independently hydrogen or a $C_1$ to $C_{20}$ group, preferably a $C_1$ to $C_{20}$ alkyl group; $R^4$ is an aryl, substituted aryl, alkyl or substituted alkyl group, preferably a $C_1$ to $C_{20}$ alkyl or substituted alkyl, or $C_6$ to $C_{20}$ aryl or substituted aryl group; and x is a number greater than 12, preferably from 12 to 5000, preferably from 15 to 2500, preferably 20 to 2000.

4. The process of paragraph 1, wherein the vinyl containing material is a polydiene or an alpha-olefin-diene copolymer.

5. The process of any of the above paragraphs, wherein:

1) the transition metal amide is represented by the formula: $M(NR^5R^6)_xX_yL_z$:

where M is a group 3, 4, 5, or 6 transition metal or a lanthanide or actinide metal of the Periodic Table of the Elements, preferably a group 4 or 5 metal, preferably a group 5 metal, preferably scandium, yttrium, titanium, zirconium, hafnium, vanadium, niobium, tantalum, chromium, molybdenum, tungsten, cerium, thorium, or uranium, preferably tantalum or zirconium, preferably tantalum;

$R^5$ and $R^6$ are each, independently hydrogen or a substituted or unsubstituted alkyl or substituted or unsubstituted aryl group, preferably a substituted or unsubstituted alkyl group containing between 1 to 20 carbon atoms (preferably 1 to 10 carbon atoms, preferably 1 to 6 carbon atoms) or a substituted or unsubstituted aryl containing from 6 to 20 carbon atoms (preferably 6 to 15 carbon atoms, preferably 6 to 10 carbon atoms), preferably $R^5$ and $R^6$ are each, independently hydrogen, methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, xylyl, (preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl), where $R^5$ and $R^6$ can be joined in a ring system, preferably a substituted or unsubstituted 5 or 6 membered ring aromatic or non-aromatic ring, such as substituted or unsubstituted piperidinyl, or substituted or unsubstituted pyrazolyl;

provided that at least one of $R^5$ and $R^6$ is not hydrogen, preferably both of $R^5$ and $R^6$ are not hydrogen;

x+y is 3, 4, 5, or 6 (preferably x+y is 4 or 5, preferably 5);

x is 1, 2, 3, 4, 5, 6 (preferably x is 2, 3, 4 or 5, preferably 5);

y is 0, 1, 2, 3, or 4 (preferably y is 0, 2 or 3, preferably 0 or 2);

z is 0, 1, 2, or 3;

L is a neutral Lewis base, such as tetrahydrofuran or dimethylamine;

X is an anionic ligand, such as one or more halides, alkoxides, phenolates, amidinates, amidates, sulfonates, acetate, or sulfonates;

2) the alkyl amine is a $C_2$ to $C_{40}$ secondary amine, represented by the formula: $HNR^9_2$, wherein each $R^9$ is, independently a group containing from 1 to 20 carbon atoms; and 3) the vinyl terminated polyolefin has at least 30% allyl chain ends (relative to total unsaturations).

6. The process of any of paragraphs 1 to 5, wherein the alkyl amine is represented by the formula: $R^4NHCH(R^2)(R^3)$, where:

$R^2$ is, independently, hydrogen, a $C_1$ to $C_{20}$ group, preferably a $C_1$ to $C_{20}$ alkyl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl;

$R^3$ is, independently, a $C_1$ to $C_{20}$ group, preferably a $C_1$ to $C_{20}$ alkyl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl; and $R^4$ is an aryl or alkyl group, preferably a $C_1$ to $C_{20}$ alkyl or a $C_6$ to $C_{20}$ aryl group (preferably methyl, ethyl, propyl, butyl, pentyl, hexyl, heptyl, octyl, nonyl, decyl, undecyl, dodecyl, 3,5,5-trimethyl-hexene, phenyl, methylphenyl, tolyl, or xylyl, preferred phenyl groups include phenyls substituted with one or more $C_1$ to $C_{20}$ alkyl groups, such as 4-alkyl-substituted phenyl, 2-alkyl-substituted phenyl, 3,5-dialkyl-substituted phenyl, 2,4,6-trialkylsubstituted phenyl, 2,5-dialkylsubstituted phenyl, (particularly preferred secondary amines include N-methyl substituted secondary amines, such as N-methyl aniline and methylhexylamine).

7. The process of any of the above paragraphs 1 to 6, wherein the vinyl terminated polyolefin has at least 30% allyl chain ends (relative to total unsaturations), preferably at least 40%, preferably at least 50%, preferably at least 60%, preferably at least 70%, preferably at least 80%, preferably at least 90%, preferably at least 95%.

8. The process of any of the above paragraphs 1 to 7, wherein the vinyl terminated polyolefin has an Mn of 200 g/mol or more, preferably 7,500 g/mol or more, preferably from 200 to 60,000 g/mol.

9. The process of any of the above paragraphs 1 to 8, wherein the vinyl terminated polyolefin is a polymer of ethylene and/or propylene.

10. The process of any of the above paragraphs 1 to 9, wherein the vinyl terminated polyolefin is a copolymer of propylene and at least 10 mol % of one or more $C_4$ to $C_{40}$ olefins and has at least 30% allyl chain ends (relative to total unsaturations); and 2) an Mn of from 200 to 60,000 g/mol.

11. The process of any of the above paragraphs 1 to 9, wherein the vinyl terminated polyolefin is a copolymer of propylene and a $C_5$ to $C_{40}$ olefin and has an MFR of 0.1 to 500 dg/min (ASTM 1238, 2.16 kg, 230° C.).

12. The process of any of paragraphs 1 to 10, wherein the vinyl terminated polyolefin has an Mn of 200 g/mol or more and comprises: (i) from about 20 to 99.9 mol % of at least one $C_5$ to $C_{40}$ olefin; and (ii) from about 0.1 to 80 mol % of propylene, wherein the vinyl terminated polyolefins has at least 40% allyl chain ends, an isobutyl chain end to allylic chain end ratio of less than 0.70:1, an allyl chain end to vinylidene chain end (as determined by $^1$H NMR) ratio of more than 2:1.

13. The process of any of paragraphs 1 to 10, wherein the vinyl terminated polyolefin has a g'(vis) of 0.90 or less, at least 40% allyl chain ends (relative to total unsaturations); and 2) an Mn of from of 7,500 to 60,000 g/mol.

14. The process of any of paragraphs 1 to 10, wherein the vinyl terminated polyolefin is a branched polyolefin having an Mn of 60,000 g/mol or more comprising one or more alpha olefins, and having: (i) 50 mol % or greater allyl chain ends, relative to total unsaturated chain ends; (ii) a g'(vis) of 0.90 or less; and (iii) a bromine number which, upon complete hydrogenation, decreases by at least 50%.

15. The process of any of paragraphs 1 to 10, wherein the vinyl terminated polyolefin is a branched polyolefin having an Mn of less than 7,500 g/mol, preferably from 100 to 7,000 g/mol, preferably from 400 to 6,500 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), and having: (i) 50 mol % or greater allyl chain ends, relative to total unsaturated chain ends (preferably 60% or more, preferably 70% or more, preferably 80% or more, preferably 90% or more, preferably 95% or more); (ii) a ratio of percentage of saturated chain ends to percentage of allyl chain ends of 1.2 to 2.0 (preferably a ratio of percentage of saturated chain ends (preferably isobutyl chain ends) to percentage of allyl chain ends of 1.6 to 1.8, wherein the percentage of saturated chain ends is determined using $^{13}C$ NMR as described in WO 2009/155471 at paragraph [0095] and [0096] except that the spectra are referenced to the chemical shift of the solvent, tetrachloroethane-$d_2$, and/or a ratio of Mn(GPC)/Mn($^1$H NMR) of 0.95 or less (preferably 0.90 or less, preferably 0.85 or less, preferably 0.80 or less); (iii) optionally, a bromine number which, upon complete hydrogenation, decreases by at least 50% (preferably by at least 75%); (iv) optionally, an allyl chain end to internal vinylidene ratio of greater than 5:1 (preferably greater than 10:1); and (v) optionally, an allyl chain end to vinylidene chain end ratio of greater than 2:1 (preferably greater than 10:1), preferably the branched vinyl terminated polyolefin has a ratio of Mn(GPC)/Mn($^1$H NMR) of 0.95 or less (preferably 0.90 or less, preferably 0.85 or less, preferably 0.80 or less).

16. The process of any of paragraphs 1 to 15, wherein the vinyl terminated polyolefin comprises ethylene and propylene.

17. The process of any of paragraphs 1 to 16, wherein the vinyl containing material is one or more of:

1) a propylene polymer;

2) an alpha-olefin-diene copolymer, preferably having an Mn of 300 g/mol or more (preferably 1000 g/mol or more, preferably from 1500 to 250,000 g/mol) comprising a $C_2$ to $C_{20}$ alpha olefin (such as ethylene, propylene, butene, hexene, octene and/or decene) and a $C_4$ to $C_{20}$ diene, (such as an alpha-omega diene, preferably, 1,5-hexadiene, 1,7-octadiene, 1,9 decadiene, 1,3-butadiene), and, optionally, having at least 5 amine groups per chain (preferably at least 10 amine groups per chain, have at least 15 amine groups per chain, preferably at least 20 amine groups per chain, have at least 30 amine groups per chain, preferably at least 50 amine groups per chain); and 3) a polydiene polymer having an Mn of 300 g/mol or more (preferably 1000 g/mol or more, preferably from 1500 to 250,000 g/mol) and comprising one or more $C_4$ to $C_{12}$ dienes, (such as an alpha-omega diene, preferably, 1,5-hexadiene, 1,7-octadiene, 1,9 decadiene, 1,3-butadiene), and optionally having at least 5 amine groups per chain (preferably at least 10 amine groups per chain, have at least 15 amine groups per chain, preferably at least 20 amine groups per chain, have at least 30 amine groups per chain, preferably at least 50 amine groups per chain).

18. An amine functionalized polyolefin produced by any of the above paragraphs 1 to 17.

19. The amine functionalized polyolefin of paragraph 18, wherein the amine functionalized polyolefin has been derivitized.

20. A blend comprising the amine functionalized polyolefin of paragraph 18 or the derivitized amine functionalized polyolefin of paragraph 19 and at least one other polymer (preferably present at preset at from 0.1 to 99.9 wt %), preferably an elastomer or thermoplastic polymer as defined herein, preferably an impact copolymer.

21. The amine functionalized polyolefin (of derivative thereof) of paragraphs 18 and 19 or the blend of paragraph 20 further comprising inorganic or metallic particles (preferably graphene; graphene oxide, single wall nanotubes or multi wall nanotubes).

EXAMPLES

Tests and Materials

Products were characterized by $^1$H NMR and DSC as follows:

$^1$H NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons. $M_n$ is determined by $^1$H NMR spectroscopy by comparison of integrals of the aliphatic region to the olefin region as determined using the protocol described in the Experimental section of WO 2009/155471.

Differential Scanning Calorimetry

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

All molecular weights are number average unless otherwise noted. All molecular weights are reported in g/mol, unless otherwise noted.

The following abbreviations are used in the Examples:

Catalyst A is pentakis(dimethylamido)tantalum), i.e., (Ta(NMe$_2$)$_5$), and Me is methyl. aPP is atactic polypropylene, iPP is isotactic polypropylene, EP is ethylene-propylene copolymer, TCE is 1,1,2,2-tetrachloroethane, h is hours, min is minutes. The vinyl-terminated polyolefins listed in Table 1 were prepared according to procedures described in U.S. Ser. No. 12/143,663, filed on Jun. 20, 2008.

TABLE 1

Amine-terminated polyolefins prepared from vinyl-terminated polyolefins and N-methylaniline General reaction:

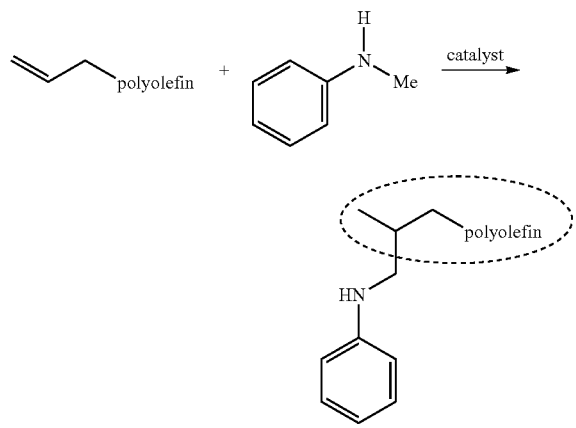

The portion of the product derived from the vinyl-terminated polyolefin is circled.

| Ex. | Vinyl terminated polyolefin | $M_n$ by $^1$H NMR of amine functionalized polyolefin (g/mol) | % amine functionalization by $^1$H NMR | $M_n$ of vinyl-terminated polyolefin by $^1$H NMR (g/mol) | % vinyl end groups in vinyl-terminated polyolefin by $^1$H NMR |
|---|---|---|---|---|---|
| 1 | aPP | 809 | 87 | 571 | 98 |
| 2 | aPP | 974 | 99 | 571 | 98 |
| 3 | aPP | 3189 | 100 | 1952 | 97 |
| 4 | iPP | 13861 | 27 | 14400 | 53 |
| 5 | iPP | 17200 | 85 | 11900 | 85 |
| 6 | iPP | 25500 | 59 | 23700 | 66 |
| 7 | PE | 1170 | 95 | 1004 | 97 |
| 8 | PE | 1334 | 100 | 688 | 94 |
| 9 | EP | 10526 | 67 | 11290 | 60 |
| 10 | octadecene | 252 | 33 | 252 | ~100 |

Example 1

Synthesis of Amine-Terminated Atactic Polypropylene

Atactic polypropylene (6.90 g, 12.1 mmol ends) containing mostly vinyl (98%) end groups with an $M_n$ of 571 was combined with N-methyl aniline (1.81 g, 16.9 mmol) and pentakis(dimethylamido)tantalum (0.243 g, 0.604 mmol) in a loosely capped vial. The mixture was heated on a block kept at 180° C. After 18 hours the mixture was poured into stirring methanol (120 mL). After stirring for 1 hour the mixture was allowed to settle out. The methanol layer was decanted off and the remaining thick oil was dried in a vacuum oven at 70° C. overnight. $^1$H NMR data indicates that the product is 87% amine functionalized with the remainder being unreacted vinyls (12%) and vinylidenes (1%). Yield: 5.43 g. The data are reported in Table 1 above.

Example 2

Synthesis of Amine-Terminated Atactic Polypropylene

Atactic polypropylene (39.8 g, 69.7 mmol ends) containing mostly vinyl (98%) end groups with an $M_n$ of 571 was combined with hexanes (15 mL) and the mixture was heated to 120° C. for 30 min. Then N-methyl aniline (14.9 g, 139 mmol) and pentakis(dimethylamido)tantalum (1.47 g, 3.66 mmol) were added and the mixture was heated to 185° C. for 18 hours. The mixture was poured into stirring methanol (600 mL) and heated to boiling briefly. The mixture was stirred for a few hours and then allowed to settle. The methanol layer was decanted off and the remaining thick oil was washed with additional methanol (200 mL) before being dried in a vacuum oven at 70° C. overnight. $^1$H NMR data indicate that the product is 99% amine functionalized with only trace amounts of unreacted vinyls (<1%) and vinylidenes (<1%). Yield: 30.5 g. The data are reported in Table 1 above.

Example 3

Synthesis of Amine-Terminated Atactic Polypropylene

Atactic polypropylene containing 97% vinyl end groups (52.0 g, 26.6 mmol ends) with $M_n$ of 1952 was combined with hexane (10 mL) and the mixture was heated to 140° C. to cause the hexane to boil off. Then N-methyl aniline (5.71 g, 53.3 mmol) and pentakis(dimethylamido)tantalum (1.07 g, 2.66 mmol) were added and the mixture was heated to 180° C. for 2 hours. The temperature was raised to 185° C. and the mixture was left stirring over night. Some time during the night both heat and stirring failed. NMR spectroscopy indicated that around 10% to 20% of the vinyl groups remained unreacted. Additional pentakis(dimethylamido)tantalum (0.30 g, 0.75 mmol) was added and the mixture was heated to 185° C. for three days. Then the brown mixture was poured into methanol (600 mL). The mixture was heated to reflux with stirring. The yellow methanol layer was decanted off to yield a white thick oil. This was washed with hot methanol and then extracted into diethyl ether (300 mL) and filtered through Celite. Removal of the volatiles afforded a thick oil that was dried in a vacuum oven overnight. $^1$H NMR data indicated that essentially all of the vinyl groups had been consumed and converted to amine-terminated product. Yield: 47.6 g. The data are reported in Table 1 above.

Example 4

Synthesis of Amine-Terminated Polypropylene

Polypropylene containing both vinyl (53%) and vinylidene (46%) end groups (1.06 g, 0.0736 mmol ends) with $M_n$ of 14400 and a $T_m$ of 138° C. was combined with N-methyl aniline (0.100 mL, 0.919 mmol) and pentakis(dimethylamido)tantalum (0.0402 g, 0.100 mmol) in a vial. The vial was heated on a block kept at 185° C. After 16 hours $^1$H NMR data indicated that essentially all of the vinyl groups had been consumed and converted to amine-terminated product. Vinylidenes were mostly unreacted. Yield: 1.06 g. The data are reported in Table 1 above.

Example 5

Synthesis of Amine-Terminated Polypropylene

Polypropylene containing both vinyl (83%) and vinylidene (13%) end groups (2.60 g, 0.218 mmol ends) with $M_n$ of 11900 and a $T_m$ of 93° C. was combined with pentakis(dimethylamido)tantalum (0.0942 g, 0.235 mmol) with xylenes (5 mL). Then N-methyl aniline (0.100 mL, 0.919 mmol) was added and the mixture was heated to 170° C. in a Teflon-capped vial. After 3 days some leakage around the cap was evident. The brown mixture was poured into methanol (200 mL). The resulting solid was broken up in a mortar and pestle, washed with methanol (80 mL) and dried in a vacuum oven. $^1$H NMR data indicated that essentially all of the vinyl groups had been consumed and converted to amine-terminated product. Vinylidenes were mostly unreacted. Yield: 2.45 g. The data are reported in Table 1 above.

Example 6

Synthesis of Amine-Terminated Polypropylene

Polypropylene containing both vinyl (66%) and vinylidene (34%) end groups (13.1 g, 0.553 mmol ends) with $M_n$ of 23700 and a $T_m$ of 143° C. and toluene (10 mL) were combined and heated on a block kept at 185° C. After 15 minutes N-methyl aniline (0.285 mL, 2.62 mmol) and pentakis(dimethylamido)tantalum (0.105 g, 0.264 mmol) were added to the thick mixture. After 16.5 hours xylenes (40 mL) were added. The mixture was warmed to form a homogeneous solution that was then poured into stirring methanol (600 mL). The mixture was heated to reflux briefly then cooled to ambient temperature while stirring. The polymer was collected on a fritted disk, washed with methanol (200 mL), acetone (200 mL) and hexane (200 mL). The product was dried in a vacuum oven. $^1$H NMR data indicated 0.324 amine per 1000 carbons, 0.225 vinylidene per 1000 carbons. Yield: 12.3 g. The data are reported in Table 1 above.

Example 7

Synthesis of Amine-Terminated Polyethylene

Polyethylene containing 97% vinyl end groups (51.52 g, 54.3 mmol ends) with $M_n$ of 1004 and a $T_m$ of 119° C. was combined with N-methyl aniline (11.0 g, 103 mmol) and pentakis(dimethylamido)tantalum (2.06 g, 5.13 mmol) in a thick walled round bottomed flask that was sealed with a Teflon cap. The mixture was heated on a metal block kept at 195° C. for 21 h. Then the hot mixture was poured into stirring methanol (1.2 L). The polymer was collected and ground to a coarse powder. This was washed with methanol (2×200 mL) and ether (100 mL). The product was dried in a vacuum oven. $^1$H NMR data indicated 11.36 amine per 1000 carbons, 0.57 vinylene per 1000 carbons. Yield: 53.5 g. The data are reported in Table 1 above.

Example 8

Synthesis of Amine-Terminated Polyethylene

Vinyl-terminated polyethylene (3.31 g, 4.81 mmol vinyl ends) with $M_n$ of 688 was combined with N-methyl aniline (1.00 mL, 9.19 mmol) and pentakis(dimethylamido)tantalum (0.190 g, 0.473 mmol) in a vial. The vial was heated on a block kept at 185° C. After 16 hours $^1$H NMR data indicated that essentially all of the starting vinyl groups had been consumed to form the amine-terminated product. Cooling to ambient temperature formed a solid that was dissolved in boiling toluene (20 mL). The toluene solution was then poured into stirring methanol (100 mL) to yield a white precipitate that was collected on a glass frit and washed thoroughly with methanol. The product was dried in a vacuum oven at 70° C. for 3 days. Yield: 3.04 g. $^1$H NMR (D$_2$-TCE, 500 MHz, 385 K): product resonances δ 7.17 (2H, t), 6.69 (1H, t), 6.62 (2H, d), 3.61 (1H, br), 3.10 (1H, dd, PhNCHH), 2.94 (1H, dd, PhNCHH), 1.77 (1H, m), 1.5-1.1 (PE backbone), 1.02 (3H, d, CHMe), 0.94 (3H, t, CH$_2$Me). The data are reported in Table 1 above.

Example 9

Synthesis of Amine-Terminated Ethylene-Propylene Copolymer

Ethylene propylene copolymer (3.105 g, 0.275 mmol ends) containing mostly vinyl (60%) and vinylidene (32%) end groups with an $M_n$ of 11290 was combined with N-methyl aniline (0.295 g, 2.75 mmol) and xylenes (5 mL), and the mixture was heated to reflux. After a couple of minutes pentakis(dimethylamido)tantalum (0.110 g, 0.275 mmol) was added in a few portions. The mixture was heated on a metal block kept at 160° C. overnight. Then additional xylenes (10 mL) was added and the hot mixture was poured into stirring methanol (150 mL). The white precipitate was collected on a glass frit then crushed and thoroughly washed with methanol. The solid was dissolved in boiling toluene (100 mL) and filtered. The toluene was removed by rotary evaporator and the solid was washed with additional methanol. The product was dried in a vacuum oven at 70° C. overnight. $^1$H NMR data indicate that the product is 67% amine functionalized with the remainder being unreacted vinylidene-terminated polymer (33%). Yield: 2.94 g. The data are reported in Table 1 above.

Example 10

Synthesis of Amine-Terminated Octadecene

1-Octadecene (0.772 g, 3.06 mmol) was combined with N-methyl aniline (0.328 g, 3.06 mmol) and bis(diethylamido)tantalum trichloride (0.0396 g, 0.0917 mmol) in a vial. The vial was heated on a block kept at 180° C. A clear orange solution formed quickly that became cloudy red-orange after 10 minutes. After 10 minutes $^1$H NMR spectroscopic data indicated 33% conversion of the 1-octadecene to the amine-functionalized product. Further, heating gave little additional conversion to the desired product, apparently due to decomposition of the catalytically active species. The data are reported in Table 1 above.

All documents described herein are incorporated by reference herein, including any priority documents, related applications and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A process to functionalize polyolefins comprising contacting a transition metal amide catalyst with a secondary amine, and one or more vinyl terminated polyolefins.

2. The process of claim 1, wherein the functionalized polyolefin is an amine-functionalized polyolefin represented by the formula:

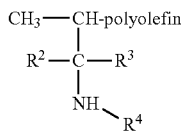

where $R^2$ and $R^3$ are each, independently, hydrogen or a $C_1$ to $C_{20}$ group; $R^4$ is an aryl or alkyl group; and polyolefin is a homopolymer or copolymer of one or more $C_2$ to $C_{40}$ olefin.

3. The process of claim 2, wherein $R^2$ and $R^3$ are each, independently, hydrogen or a $C_1$ to $C_{20}$ alkyl group, and/or $R^4$ is a $C_1$ to $C_{20}$ alkyl or $C_6$ to $C_{20}$ aryl group.

4. The process of claim 1, wherein the functionalized polyolefin is an amine-functionalized polyolefin represented by the formula:

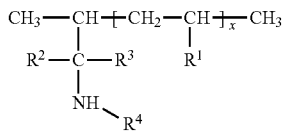

where $R^1$ is either hydrogen, or a $C_1$ to $C_{18}$ group; $R^2$ and $R^3$ are each, independently hydrogen or a $C_1$ to $C_{20}$ group; $R^4$ is an aryl or alkyl group; and x is a number greater than 12.

5. The process of claim 4, wherein where $R^1$ is hydrogen, methyl, ethyl, butyl, hexyl, or octyl; and/or $R^2$ and $R^3$ are each, independently hydrogen or a $C_1$ to $C_{20}$ alkyl group; and/or $R^4$ is a $C_1$ to $C_{20}$ alkyl or $C_6$ to $C_{20}$ aryl group; and/or x is a number from 15 to 5000.

6. The process of claim 1, wherein the polyolefin is a homopolymer or copolymer of ethylene.

7. The process of claim 1, wherein the polyolefin is a homopolymer or copolymer of propylene.

8. A process to functionalize polyolefins comprising contacting a transition metal amide catalyst with an alkyl amine and one or more vinyl terminated polyolefins, wherein:
1) the transition metal amide is represented by the formula: $M(NR^5R^6)_xX_yL_z$, where M is a group 3, 4, 5, or 6 transition metal or a lanthanide or actinide metal of the Periodic Table of the Elements; $R^5$ and $R^6$ are each, independently, hydrogen or a substituted or unsubstituted alkyl or a substituted or unsubstituted aryl group, provided that at least one of $R^5$ and $R^6$ is not hydrogen; x+y is 3, 4, 5, or 6; x is 1, 2, 3, 4, 5, 6; y is 0, 1, 2, 3, or 4; z is 0, 1, 2, or 3; X is an anionic ligand selected from halides, alkoxides, phenolates, amidinates, amidates, sulfonates, acetate, and sulfonates; L is a neutral Lewis base;
2) the alkyl amine is a $C_2$ to $C_{40}$ secondary amine, represented by the formula: $HNR^9{}_2$, wherein each $R^9$ is, independently a group containing from 1 to 20 carbon atoms; and
3) the vinyl terminated polyolefin has at least 30% allyl chain ends (relative to total unsaturations).

9. The process of claim 8, wherein M is scandium, yttrium, titanium, zirconium, hafnium, vanadium, niobium, tantalum, chromium, molybdenum, tungsten, cerium, thorium, or uranium, and/or $R^5$ and $R^6$ are each, independently, hydrogen or a substituted or unsubstituted alkyl group containing between 1 to 20 carbon atoms or a substituted or unsubstituted aryl containing from 6 to 20 carbon atoms.

10. The process of claim 8, wherein M is tantalum or zirconium.

11. The process of claim 8, wherein M is tantalum.

12. The process of claim 8, wherein L is tetrahydrofuran or dimethylamine.

13. The process of claim 8, wherein the secondary amine is represented by the formula: $R^4NHCH(R^2)(R^3)$, where $R^2$ is, independently, hydrogen, or a $C_1$ to $C_{20}$ group, $R^3$ is, independently, a $C_1$ to $C_{20}$ group, and $R^4$ is an aryl or alkyl group.

14. The process of claim 8, wherein the secondary amine is represented by the formula: $R^4NHCH(R^2)(R^3)$, where $R^2$ is, independently, hydrogen, or a $C_1$ to $C_{20}$ alkyl group, $R^3$ is, independently, a $C_1$ to $C_{20}$ alkyl group, and $R^4$ is a $C_1$ to $C_{20}$ alkyl or a $C_6$ to $C_{20}$ aryl group.

15. The process of claim 8, wherein the vinyl terminated polyolefin has at least 50% allyl chain ends (relative to total unsaturations).

16. The process of claim 8, wherein the vinyl terminated polyolefin has at least 80% allyl chain ends (relative to total unsaturations).

17. The process of claim 8, wherein the vinyl terminated polyolefin has at least 90% allyl chain ends (relative to total unsaturations).

18. The process of claim 8, wherein the vinyl terminated polyolefin has an Mn of from 200 to 60,000 g/mol.

19. The process of claim 8, wherein the vinyl terminated polyolefin comprises propylene and at least 10 mol % of a $C_4$ or greater olefin and has: 1) at least 30% allyl chain ends (relative to total unsaturations); and 2) an Mn of from 200 to 60,000 g/mol.

20. The process of claim 8, wherein the vinyl terminated polyolefin has an Mn of 200 g/mol or more and comprises: (i) from about 20 to 99.9 mol % of at least one $C_5$ to $C_{40}$ olefin; and (ii) from about 0.1 to 80 mol % of propylene, wherein the vinyl terminated polyolefins has at least 40% allyl chain ends, an isobutyl chain end to allylic chain end ratio of less than 0.70:1, an allyl chain end to vinylidene chain end (as determined by $^1H$ NMR) ratio of more than 2:1.

21. The process of claim 8, wherein the vinyl terminated polyolefin has a g'(vis) of 0.90 or less, at least 40% allyl chain ends (relative to total unsaturations) and an Mn of from of 7,500 to 60,000 g/mol.

22. The process of claim 8, wherein the vinyl terminated polyolefin is a branched polyolefin having an Mn of 60,000 g/mol or more comprising one or more alpha olefins, and having: (i) 50 mol % or greater allyl chain ends, relative to total unsaturated chain ends; (ii) a g'(vis) of 0.90 or less; and (iii) a bromine number which, upon complete hydrogenation, decreases by at least 50%.

23. The process of claim 8, wherein the vinyl terminated polyolefin is a branched polyolefin having an Mn of less than 7500 g/mol comprising one or more alpha olefins, and having: (i) 50 mol % or greater allyl chain ends, relative to total unsaturated chain ends; (ii) a ratio of percentage of saturated chain ends to percentage of allyl chain ends of 1.2 to 2.0 and/or a ratio of Mn(GPC)/Mn($^1H$ NMR) of 0.95 or less; and (iii) a bromine number which, upon complete hydrogenation, decreases by at least 50%.

24. The process of claim 8, wherein the vinyl terminated polyolefin comprises ethylene and propylene.

* * * * *